(12) United States Patent
Yamaguchi

(10) Patent No.: US 7,196,855 B2
(45) Date of Patent: Mar. 27, 2007

(54) IMAGE-CAPTURING LENS, IMAGE-CAPTURING DEVICE AND IMAGE CAPTURING UNIT

(75) Inventor: Susumu Yamaguchi, Hachioji (JP)

(73) Assignee: Konica Corporation, Tokyo (JP)

( * ) Notice: Subject to any disclaimer, the term of this patent is extended or adjusted under 35 U.S.C. 154(b) by 917 days.

(21) Appl. No.: 10/392,966

(22) Filed: Mar. 21, 2003

(65) Prior Publication Data

US 2003/0193605 A1    Oct. 16, 2003

(30) Foreign Application Priority Data

Mar. 25, 2002    (JP)    ............................. 2002-083880

(51) Int. Cl.
  *G02B 9/14*    (2006.01)
  *G02B 13/16*   (2006.01)
  *G02B 13/18*   (2006.01)

(52) U.S. Cl. ................. 359/785; 348/335; 359/716

(58) Field of Classification Search ............ 348/35; 359/716, 784, 785
See application file for complete search history.

(56) References Cited

U.S. PATENT DOCUMENTS

| | | | | |
|---|---|---|---|---|
| 3,912,379 A * | 10/1975 | DeJager | ..................... | 359/789 |
| 4,620,775 A * | 11/1986 | Fujioka | ..................... | 359/739 |
| 5,251,063 A   | 10/1993 | Baumann | | |
| 6,476,982 B1 * | 11/2002 | Kawakami | ................. | 359/791 |
| 6,728,047 B2 * | 4/2004 | Sato et al. | ................. | 359/786 |
| 6,813,099 B2 * | 11/2004 | Yamaguchi | ................. | 359/779 |
| 6,970,306 B2 * | 11/2005 | Matsuo | ..................... | 359/716 |
| 6,977,779 B2 * | 12/2005 | Shinohara | ................. | 359/716 |
| 2002/0012176 A1 | 1/2002 | Ning | | |
| 2005/0068456 A1 * | 3/2005 | Ohta et al. | ................. | 348/360 |
| 2005/0264670 A1 * | 12/2005 | Yamaguchi et al. | ........ | 348/335 |

FOREIGN PATENT DOCUMENTS

| | | | |
|---|---|---|---|
| EP | 0269868 A1 | | 6/1988 |
| EP | 1348990 A1 * | | 10/2003 |
| JP | 08 234097 | | 9/1996 |

OTHER PUBLICATIONS

Smith, Warren J., "Modern Optical Engineering," McGraw-Hill, New York, XP002239380, pp. 141-143.

* cited by examiner

*Primary Examiner*—David N. Spector
(74) *Attorney, Agent, or Firm*—Finnegan, Henderson, Farabow, Garrett & Dunner, L.L.P.

(57) ABSTRACT

An image capturing lens to capture an image of an object is provided with an aperture diaphragm having an aperture through which an image is captured; a first lens having a positive refracting power, wherein both surfaces of the first lens are shaped in a convex form; a second lens having a negative refracting power, wherein an object-side surface of the second lens is shaped a convex form; and a third lens which is a meniscus lens whose convex surface faces toward the object side; wherein the aperture diaphragm, the firs lens, the second lens and the third lens are aligned in this order from the object side.

16 Claims, 18 Drawing Sheets

FIG. 3 (b)
FIG. 3 (a)
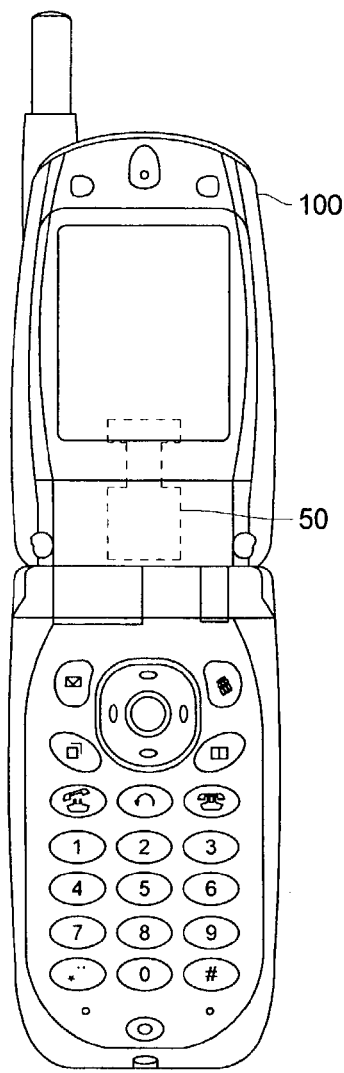
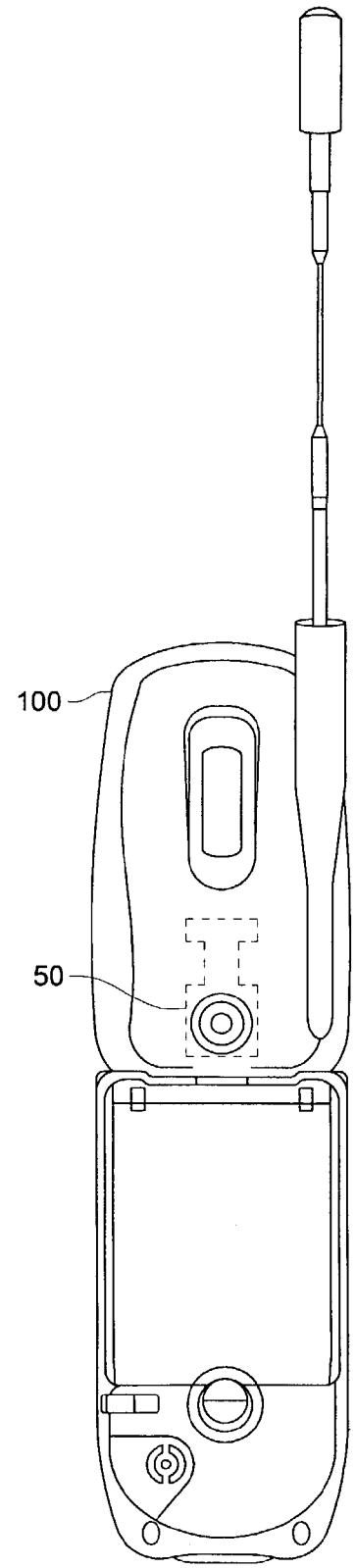

COMA (M)

IMAGE-CAPTURING LENS, IMAGE-CAPTURING DEVICE AND IMAGE CAPTURING UNIT

BACKGROUND OF THE INVENTION

The present invention relates to an image-capturing lens which is suitable as an optical system of a solid state image-capturing device such as a CCD type image sensor or a CMOS type image sensor.

In recent years, a cell-phone and a personal computer each being equipped with an image-capturing apparatus are coming into wide use, with high-performance and downsizing of an image-capturing apparatus employing a solid state image-capturing device such as a CCD (Charge Coupled Device) type image sensor or a CMOS (Complementary Metal Oxide Semiconductor) type image sensor.

Because of high density caused by downsizing or an increase of functions in these cell-phone and personal computer, there are increasing demands for further downsizing of an image-capturing lens carried on the image-capturing apparatus, for realizing a small-sized image-capturing apparatus.

As an image-capturing lens for this small-sized image-capturing apparatus, a lens of a structure of three lenses wherein a first lens having positive refracting power, second lens having negative refracting power and a third lens having positive refracting power are arranged in this order from an object side is becoming popular in recent years, because an image-capturing lens of this type can be of higher performance, compared with an image-capturing lens which is of a structure of a single lens or of two lenses. The image-capturing lens of the so-called triplet type of this kind is disclosed in, for example, TOKKAI No. 2001-75006.

However, the image-capturing lens of the type described in TOKKAI No. 2001-75006 has not been suitable for downsizing of a total length of the image-capturing lens (a distance from a surface located closest the object side in the entire image-capturing lens to an image-side focal point, provided that in the image-capturing lens in which the aperture diaphragm is located closest to the object side, the total length of the image-capturing lens is a distance from the aperture diaphragm to the image side focal point), although it is of a type wherein various aberrations are corrected properly while a wide field angle is secured.

SUMMARY OF THE INVENTION

In view of these problems, an object of the invention is to provide an image-capturing lens of a triplet type wherein various aberrations are properly corrected despite its lens size which is smaller than that of the convention type one.

In the construction of the invention described in Item (1), there are arranged, in the following order from the object side, an aperture-stop, a first lens in a double-convex form having positive refracting power, a second lens which has negative refracting power and has a concave surface facing the object side and a third lens in a meniscus form having a convex surface facing the object side.

In the aforesaid construction, it is possible to keep an exit pupil position to be away from an image plane because an aperture-stop is arranged to be closest to the object side.

If the exit pupil is located away more from the image plane, major light rays of the light flux emitted from a lens end surface comes to be incident in the solid-sate image-capturing element with an angle closer to be perpendicular. In other words, the telecentric characteristic can be maintained to be very well and the reduction in shading on the peripheral section of the image plane can be minimized.

Further, the fundamental construction of the image-capturing lens stated above is based on the first positive lens, the second negative lens and the third lens. Further, the first positive lens in a double-convex form having relatively large refracting power and the second negative lens are arranged in the front portion to form a construction similar to the telephoto type, and thereby to shorten the total image-capturing lens length.

In the construction of the invention described in Item (2), the construction is the same as that in the invention described in Item (1), and the third lens has positive refracting power. Due to this construction, the first positive lens, the second negative lens and the third positive lens are arranged in this order from the object side, resulting in the construction of the so-called triplet type.

In the construction of the invention described in Item (3), the construction is the same as that in the invention described in Item (1) or Item (2), and any of the first lens, the second lens and the third lens has an aspherical surface on at least one side thereof.

In the construction stated above, when an aspherical surface is used on the first positive lens, this corrects spherical aberration and coma aberration, while when an aspherical surface is used on the second negative lens, this corrects coma aberration and astigmatism. Further, in the third positive lens, an aspherical surface is used to correct various aberrations in the peripheral screen portion that is away from an optical axis, utilizing a phenomenon where the axial beam and a peripheral beam are different from each other in terms of a height of passing because the third positive lens is arranged at the position closest to the image plane.

The invention described in Item (4) is of a construction wherein the construction itself is the same as that in the invention described in Structure 1, 2 or 3, and the following conditional expressions (1)–(3) are satisfied when a distance on the optical axis from an aperture-stop to an image side focal point is represented by L, a diagonal length of an effective image plane is represented by 2Y, a focal length of the first lens is represented by f1, a focal length of the third lens is represented by f3 and a focal length of the total lens is represented by f.

$$L/2Y<1.50 \tag{1}$$

$$0.50<f1/f<0.95 \tag{2}$$

$$1.00<f3/f<1.40 \tag{3}$$

Conditional expression (1) in the aforesaid construction represents conditions for prescribing the total length of the image-capturing lens and attaining its downsizing. When the upper limit value in the expression (1) is not exceeded, the total image-capturing lens length can be made short, and the outside diameter of the image-capturing lens can be made small as a synergy effect. Incidentally, L used for calculation of the conditional expression (1) is a distance from an aperture-stop to an image side focal point, and the image side focal point means an image point that is formed when collimated ray of light that is in parallel with an optical axis enters the image-capturing lens. Further, in the case that parallel flat plate-shaped optical members such as a low-pass filter is provided between the image side surface of the third lens and the image side focal point, it may include the case that after the thickness of each of the parallel flat plate-shaped optical members is converted into an air-converted distance, the conditional expression (1) is satisfied. The air-converted distance $D_c$ is obtained by the following formula: $D_c=t/n$, where t is a thickness of an optical member such as a low-pass filter and n is the refractive index of the optical member.

Further, the conditional expression (2) is to prescribe the refracting power of the first positive lens. By exceeding the lower limit value in the expression (2), it is possible to avoid an excessive increase of the positive refracting power of the first lens, and to avoid an excessive small radius of curvature. On the other hand, when the upper limit value is not exceeded, it is possible to avoid excessive decline of the positive refracting power of the first lens, which is advantageous for downsizing of the total image-capturing lens length.

The conditional expression (3) is to prescribe the refracting power of the third positive lens. By exceeding the lower limit value in the expression (3), it is possible to avoid an excessive increase of the positive refracting power of the third lens, resulting in the appropriate distribution of positive refracting power between the first lens and the third lens (f1<f3 is more preferable in the invention). On the other hand, when the upper limit value is not exceeded, it is possible to avoid excessive decline of the positive refracting power of the third lens.

The invention described in Item (5) is of a construction wherein the construction itself is the same as that in the invention described in Structure 1, 2, 3 or 4, and the following conditional formulas are satisfied:

$$-0.60<R3/((N2-1)\cdot f)<-0.20 \quad (4)$$

where N2 is the refractive index of the second lens for d-line, R3 is the radius of curvature of the second lens on the object side, and f is the focal length of an entire image-capturing lens.

Conditional expression (4) shows conditions for making correction of the curvature of the field to be easy and for flattening an image surface, by setting negative refracting power of the second lens on the object-side to be appropriate. (In this case, since a focal length of the second lens on the object side is calculated with R3/(N2−1) by the use of radius of curvature (R3) and refractive index (N2) of the second lens, the conditional expression (4) is an expression that shows a ratio of a focal length of the second lens on the object side to a focal length of the total image-capturing lens.)

When the value of R3/(N2−1)·f) is higher than the lower limit, negative refracting power of the second lens on the object side does not grow to be greater than is needed, and it is possible to restrain generation of coma flare of abaxial light flux, which makes it possible to obtain excellent image quality. On the other hand, when the value of R3/((N2−1)·f) is lower than the upper limit, negative refracting power of the second lens on the object side can be maintained. Therefore, positive Petzval sum is reduced, and curvature of the field can be corrected easily. Further, spherical aberration and coma aberration caused on the first positive lens can be corrected properly.

The invention described in Item (6) is of a construction wherein the construction itself is the same as that in the invention described in Structure 1, 2, 3, 4 or 5, and the following expression is satisfied when v1 represents Abbe's number of the first lens and v2 represents Abbe's number of the second lens.

$$25<v1-v2 \quad (5)$$

Conditional expression (5) in the aforesaid construction represents conditions for correction of chromatic aberration for the first positive lens and the second negative lens, and axial chromatic aberration and lateral chromatic aberration are corrected by establishing to exceed the lower limit value of the expression.

The invention described in Item (7) is of a construction wherein the construction itself is the same as that in the invention described in Structure 1, 2, 3, 4, 5 or 6, and any of the first lens, the second lens and the third lens is made of plastic material. Here, the phrase "to be made of a plastic material" includes the case that the surface of a base material made of a plastic material is subjected to a coating treatment for the purpose of a reflection prevention or a surface hardness enhancement. In the below description, this definition can be applied in the same way.

In the case of manufacturing a image-capturing lens having a small radius of curvature and a small outside diameter, plastic is more suitable for mass production, compared with glass, because a manufacturing method such as injection molding can be used. In the aforesaid construction, therefore, each of the first lens, the second lens and the third lens is composed of a plastic lens.

Although application of a glass mold lens is considered as an image-capturing lens manufactured relatively easily despite a small diameter image-capturing lens, a plastic lens is thought to fit to mass production wherein manufacturing cost is kept down.

The invention described in Item (8) is of a construction wherein the construction itself is the same as that in the invention described in Structure 7, and each of the first lens, the second lens and the third lens is made of plastic material whose percentage of saturated water absorption is 0.7% or less.

Compared with a glass lens, a plastic lens has great saturation water absorption, and therefore has a problem that uneven distribution of an amount of water absorption is caused transiently when humidity is changed suddenly, causing the refractive index to be uneven, and the plastic lens tends to lose excellent image forming ability. Therefore, a solution of ability deterioration caused by humidity change is attempted by using plastic having less saturation water absorption representing a cause of the problem, for the image-capturing lens.

The invention described in Item (9) is of a construction wherein there is further provided:

a light shielding mask provided in at least one of a space between the first lens and the second lens and a space between the second lens and the third lens and to regulate a peripheral light flux.

In many cases, a plastic lens is generally in a form wherein the plastic lens has on its peripheral section a flange portion that does not contribute to image forming. When light enters this flange portion, ghost and flare are caused. It is therefore preferable to arrange a light shielding mask that regulates a peripheral light flux in at least one of the two spaces between lenses. Owing to this, only a light flux necessary for image forming is allowed to pass, and incidence of light to a flange portion can be restrained to the minimum, resulting in control of generation of ghost and flare.

Incidentally, the light shielding mask mentioned here means a light shielding member having on its central portion an aperture which allows light to pass through, and its total form is not limited to a sheet-shaped member.

The invention described in Item (10) is of a construction wherein the first lens is made of a glass material and each of the second and third lenses is made of a plastic material.

If all lenses constituting the image-capturing lens are composed of plastic lenses manufactured through injection molding, it is advantageous for downsizing, light weight and low cost of the image-capturing lens. However, a change in refractive index of plastic materials caused by temperature changes is great, and therefore, if all lenses are composed of plastic lenses, a position of an image point of the total image-capturing lens is varied by temperatures, which is a weak point.

This variation of the image point position caused by temperature changes is especially a problem for an image-capturing apparatus (so-called pan-focus type image-capturing apparatus) which is equipped with an image-capturing device having many pixels and is not equipped with an auto-focusing mechanism. In the case of the image-capturing device having many pixels, a pixel pitch is small, and a focal depth which is proportional to the pixel pitch is small, which makes an allowed width for variation of the image point position to be small. Further, the image-capturing apparatus of the pan-focus type is of the system wherein an object of scores cm is focused as a standard distance originally, and a distance ranging from infinity to the shortest distance is covered by a depth of field. Therefore, image quality for an object positioned at infinity or at the shortest distance is slightly lower than that for an object positioned at a standard distance, and if the image point position is varied by temperature changes, the image quality corresponding to infinity or the shortest distance is extremely deteriorated, which is not preferable.

In the construction of the invention, the first positive lens is made of glass material and the second negative lens and the third positive lens are made of plastic material. By making the first lens having relatively large positive refracting power to be a glass lens, it is possible to ignore a change in refractive index of the first lens in temperature changes, and to build a construction wherein a variation of an image point position of the total image-capturing lens system caused by temperature changes can be restrained to be small.

Further, by employing a glass lens for the first lens, it is not necessary to make a plastic lens that is easily scratched to be exposed, which is a preferable structure.

Now, in the case of employing a glass-mold lens for the first lens, it is necessary to establish press temperature for mold press to be high for the glass whose glass transition temperature (Tg) is generally high, by which the metal mold for molding tends to be damaged. As a result, the number of replacements for the metal mold for molding and the number of maintenances are increased, resulting in a cost increase. Therefore, when employing a glass-mold lens, it is preferable to use glass material whose Tg is 400° C. or less.

The invention described in Item (11) is of a construction wherein the following conditional formulas is satisfied:

$$f/|f23|<0.4 \qquad (6)$$

where $|f23|$ is a composite focal length of the second and third lenses and f is the focal length of an entire image capturing lens.

Conditional expression (6) prescribes a distance of a composite focal length of the second and third lenses both formed of plastic. By making the composite focal length to be large so that a conditional expression may be satisfied, it is possible to make contribution to variation of image point position of plastic lens caused by temperature changes by position of the second negative lens and that by the third positive lens to cancel each other, thus, it is possible to control the variation of image point position caused by temperature changes to be small.

The invention described in Item (12) is of a construction in Item (10) wherein each of the second and third lenses is made of a plastic material having a percentage of saturated water absorption of 0.7% or less.

The same function of Item (8) can be obtained by the structure of Item (12).

The invention described in Item (13) is of a construction in Item (10) wherein there is further provided:

a light shielding mask provided in at least one of a space between the first lens and the second lens and a space between the second lens and the third lens and to regulate a peripheral light flux.

The same function of Item (9) can be obtained by the structure of Item (13).

The invention described in Item (14) is of a construction wherein an image capturing device, comprises:

a solid-state image capturing element including a photo-electrically converting section; and the image capturing lens described in any one of Items (1) to (13) and to form an image of an object on the photo-electrically converting section of the solid-state image capturing element.

With the structure of Item (14), a miniature and high performance image capturing device can be obtained.

A concrete example of the image capturing device includes a camera and a portable terminal such as a cell-phone and PDA.

The invention described in Item (15) is of a construction wherein an image capturing unit, comprises:

a solid-state image capturing element including a photo-electrically converting section;

an image capturing lens described in any one of claims 1 to 13 and to focus an image of an object onto the photo-electrically converting section of the solid-state image capturing element;

a base board to support the solid-state image capturing element and including a terminal for an external connection to transmit and receive electrical signals; and a housing having an opening section through which image light comes from an object side to be incident in and a light shielding member, wherein the solid-state image capturing element and the image capturing lens are provided in the housing mounted on the base board so at to form a single body and the image capturing unit has a height of 10 mm or less along the optical axis.

It is possible to obtain an image-capturing unit having an advantage of downsizing and high image quality, by using image-capturing lenses in Items 1–13. Incidentally, "an aperture for incidence of light" is not always limited to one that forms a space such as a hole, and it is assumed to be a portion where an area that can transmit incident light coming from the object side is formed.

Let it be assumed that "a height of the aforementioned image-capturing unit in the direction of an optical axis of the image-capturing lens which is 10 (mm) or less" means a total length of the image-capturing unit equipped with all of the above-mentioned structures in the direction of an optical axis. Therefore, when a casing is provided on a surface of a base board and electronic parts are mounted on the back of the base board, for example, it is estimated that a distance from the front end portion of the casing on the object side to the front end portion of the electronic part protruded from the back is 10 (mm) or less.

The invention described in Item (16) is of a construction wherein a portable terminal device provided with the image capturing unit described in claim 15.

It is possible to obtain a small-sized mobile terminal capable of capturing images with high image quality, by carrying the image-capturing unit of Item 15.

BRIEF DESCRIPTION OF THE DRAWINGS

FIGS. 3(a) and 3(b) each is a view of a cell-phone.

DETAILED DESCRIPTION OF THE PREFERRED EMBODIMENT

Figure 1:
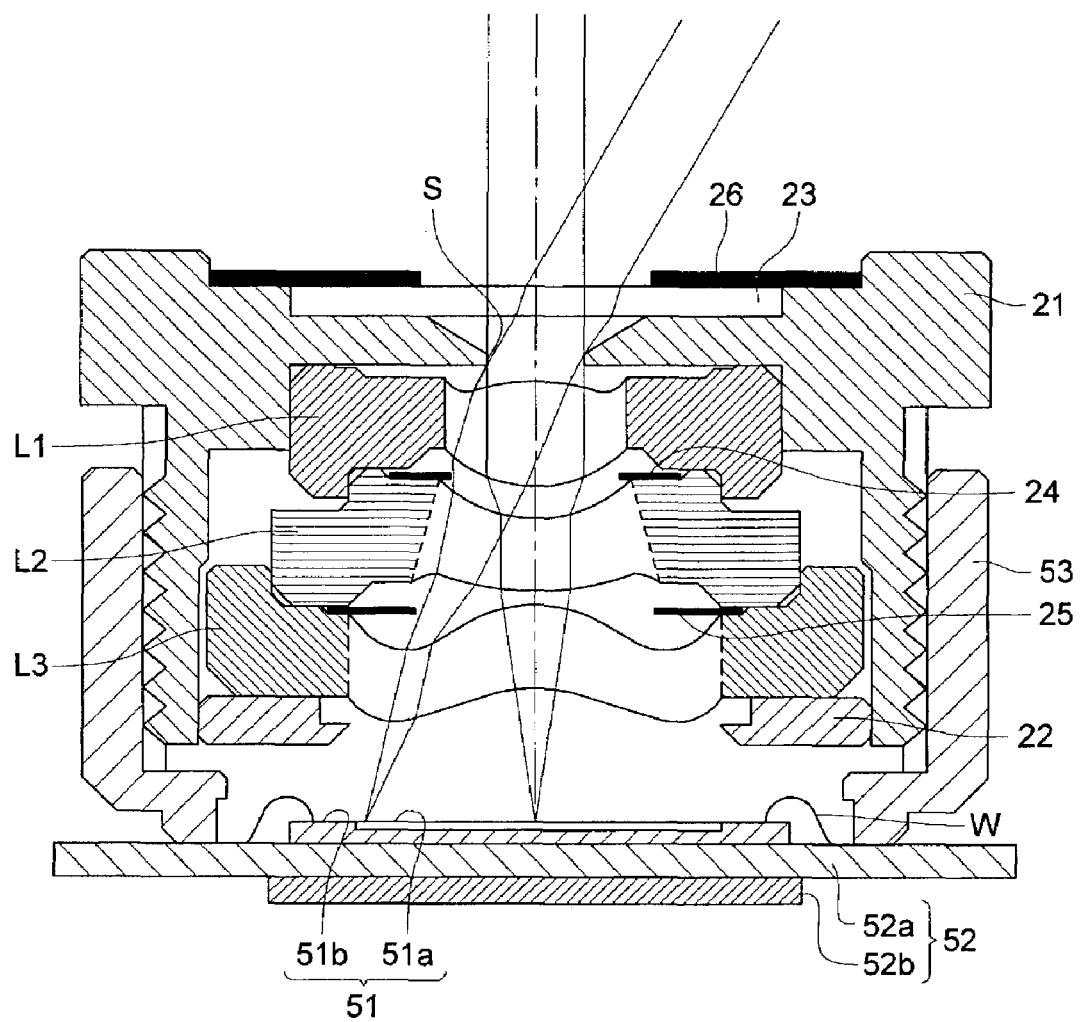
FIG. 1 shows a sectional view of a section including an optical axis of each lens of image-capturing lens unit representing an embodiment of the invention.

An embodiment of an image capturing lens unit of the invention will be explained based on FIG. 1. FIG. 1 shows a sectional view on a section including optical axes of lens 1, lens 2 and lens 3 of an image-capturing lens unit having a light shielding mask 26, an IR (infrared rays) cut filter 23 preventing incidence of infrared rays coming from an object side, an image-capturing lens wherein diaphragm S, first lens L1, second lens L2 and third lens L3 are arranged in this order from the object side, lens barrel 21 housing therein the lens L1, lens L2 and lens L3, lens holder 22 that fixes the lens L1, lens L2 and lens L3 which are arranged in the lens barrel 21. This image-capturing lens unit is one for conducting image forming of a subject image on a solid state image-capturing device such as CCD with an optical system including diaphragm S and lenses L1, L2 and L3. Incidentally, let is be assumed that in FIG. 1, the object side is on the top side, and the image side is on the bottom side, and a one-dot chain line in FIG. 1 represents an optical axis which is common to lenses L1, L2 and L3, and a light-receiving plane of the solid state image-capturing device is located at the position of a focus of incident light passing along the optical axis.

The lens barrel 21 stated above is formed from a cylindrical body having a bottom on which an aperture is provided, and it is used with its end portion on the bottom side facing the object side, and with its end portion on the open side facing the image side.

Further, the aperture is formed at the central portion on the bottom of the lens barrel 21, and this aperture serves as diaphragm S to determine F-number of the entire image capturing lens system. Further, rectangular IR-cut filter 23 is glued to be fixed on the outer side of the bottom. Incidentally, the IR-cut filter 23 may also be circular.

The light shielding mask 26 has an function to reduce the incidence of unnecessary light as small as possible and is fixed on the upper portion of the lens barrel 21 with adhesive. Incidentally, a light shielding mask applicable to the present invention is not limited to the above light shielding mask 26. For example, a light shielding mask may be formed by coating a light shielding material on the upper portion of the IR-cut filter 23.

Inside the lens barrel 21, there are housed lens L1, lens L2 and lens L3 under the condition wherein the center line of the cylindrical body of the barrel is in accord with each optical axis of L1, L2 and L3. The inside of the lens barrel 21 of this kind is set so that its inside diameter grows greater gradually in three steps as the position of the inside diameter moves from the end portion on the bottom side to the opened end portion.

On the other hand, in any of the lenses L1, L2 and L3, a portion from the lens center to a prescribed range is set to be in a range of an effective diameter having functions as a lens, and a portion that is out of the aforesaid portion is set to be a flange portion which does not function as a lens (hatched portion in each of lenses L1, L2 and L3). A portion where the inside diameter is smallest on the bottom side of the lens barrel 21 is set so that a circumferential surface of the flange portion of the first lens L1 can be fitted. Therefore, the first lens L1 is held inside the lens barrel 21 by the structure of this kind.

Further, a circular recessed portion is formed on the surface of the flange portion of the first lens L1 facing the second lens L2. Corresponding to this, a convex portion that can be fitted in the aforesaid recessed portion of the first lens L1 is formed on the surface that is a flange portion of the second lens L2 and faces the first lens L1. When the convex portion is fitted in the recessed portion, an optical axis of the first lens L1 and that of the second lens L2 can be in accord with each other accurately.

In addition, the outside diameter of a flange portion of the third lens L3 is set to be greater than the outside diameter of the flange portion of the second lens L2, and a recessed portion is formed on the surface that is a flange portion of the third lens L3 and faces the second lens L2. The inside diameter of the recessed portion of the third lens L3 is set so that the outer circumferential surface of the flange portion of the second lens L2 can be fitted.

When the second lens L2 is fitted in the recessed portion, an optical axis of the third lens L3 and that of the second lens L2 can be in accord with each other accurately.

In this way, the lenses L1, L2 and L3 are fitted in each other under the condition that their optical axes are in accord with others, in the aforesaid structure. Further, the lens barrel 21 is of the structure wherein it supports the first lens L1 with an inner circumferential surface of the smallest diameter on the bottom side alone, and other inner circumferential surfaces are not in contact with lenses L1, L2 and L3.

With an object of downsizing a total image-capturing apparatus in recent years, there have been developed image-capturing apparatuses wherein a pixel pitch is small even when the number of pixels in the image-capturing device is the same, resulting in a small image area size. A radius of curvature and an outside diameter of each image-capturing lens for the image-capturing device whose image area size is small are compelled to be small, because it is necessary to shorten a focal length of the total system for securing the same field angle. It is therefore difficult for glass lenses manufactured through the process of smoothing and polishing to be subjected to processing. Accordingly, it may be preferable that all of the lenses L1, L2 and L3 are formed through injection molding in which a material is plastic. Further, as the image capturing device, in the case of suppressing the variation in the image forming position of the entire image capturing system to be small when the temperature fluctuates, it may be preferable that the first lens is a glass-molded lens.

In the structure employed, optical axes of the lenses L1, L2 and L3 are made to be in accord with each other depending on a precision of mutual fitting. In the structure, therefore, optical axes of the lenses L1, L2 and L3 can easily be made to be in accord with each other within a range of accuracy which can be secured by injection molding, independently of accuracy of a supporting member for the lens such as the lens barrel 21. Further, it is possible to maintain prescribed accuracy for the distance in the direction of an optical axis for the lenses L1, L2 and L3, because accuracy in the axial direction for the recessed portion and the convex portion for the lenses L1, L2 and L3 can be made to be accuracy secured by injection molding. Therefore, it is possible to improve assembling accuracy for the optical system. In addition, assembling is easy, resulting in realization of improvement of productivity.

Next, a lens retaining member 22 is a ring-shaped member made of a light shielding material. After lenses L1, L2 and L3 are put into the lens barrel 21, the lens retaining member 22 is inserted with a pressure into the lens barrel 21. At this time, since the outer diameter of the lens retaining member 22 is made slightly larger than the inside diameter of the lens barrel 21, when the lens retaining member 22 is brought in contact with the lens L3 after the lens retaining member 22 is inserted with a pressure into the lens barrel 21, the lens retaining member 22 is fixed at the position with the friction force between the lens barrel 21 and the lens retaining member 22.

A lens barrel holder 53 is a cylindrical body. On an inner circumferential surface of the lens barrel holder 53, there is formed a female screw portion that is engaged with a male screw formed on an outer circumferential surface of the lens barrel 21. The lens barrel 21 is mounted on a base board 52 by the lens barrel holder 53.

Further, between lenses L1, L2 and L3, there are arranged first light shielding mask 24 and second light shielding mask 25. The first light shielding mask 24 is arranged in a circular recess whose center agrees with an optical axis, the circular recess being provided on the forefront of a convex portion of the second lens L2. This first light shielding mask 24 is ring-shaped, and an inside diameter of its central hole is set to be slightly smaller than an object-side effective diameter of the second lens L2. When the first light shielding mask 24 is arranged in the aforesaid recess, the first light shielding mask 24 is held between the first lens L1 and the second lens L2, under the condition that the center line of the first light shielding mask 24 is in accord with optical axes of lenses L1, L2 and L3. Incidentally, a depth of the aforesaid recess is established to be slightly greater than a thickness of the first light shielding mask 24, so that a mutual distance between the first lens L1 and the second lens L2 under the state of their engagement may not be influenced.

The second light shielding mask 25 is arranged in a circular recess whose center agrees with an optical axis, the circular recess being provided on the inner bottom surface of the recessed portion of the third lens L3. This second light shielding mask 25 is also ring-shaped, and an inside diameter of its central hole is set to be slightly smaller than an object-side effective diameter of the third lens L3. When the second light shielding mask 25 is arranged in the aforesaid recess, the second light shielding mask 25 is held between the second lens L2 and the third lens L3, under the condition that the center line of the second light shielding mask 25 is in accord with optical axes of lenses L1, L2 and L3. Incidentally, a depth of the aforesaid recess is established to be slightly greater than a thickness of the second light shielding mask 25, so that a mutual distance between the second lens L2 and the third lens L3 under the state of their engagement may not be influenced.

Mutual actions between the aforesaid diaphragm S and light shielding masks 24 and 25 prevent that a ray of light entered through the diaphragm S enters the outside of effective diameters of the lenses L1, L2 and L3, thus, it is possible to repress occurrence of ghost and flare.

Figure 2:
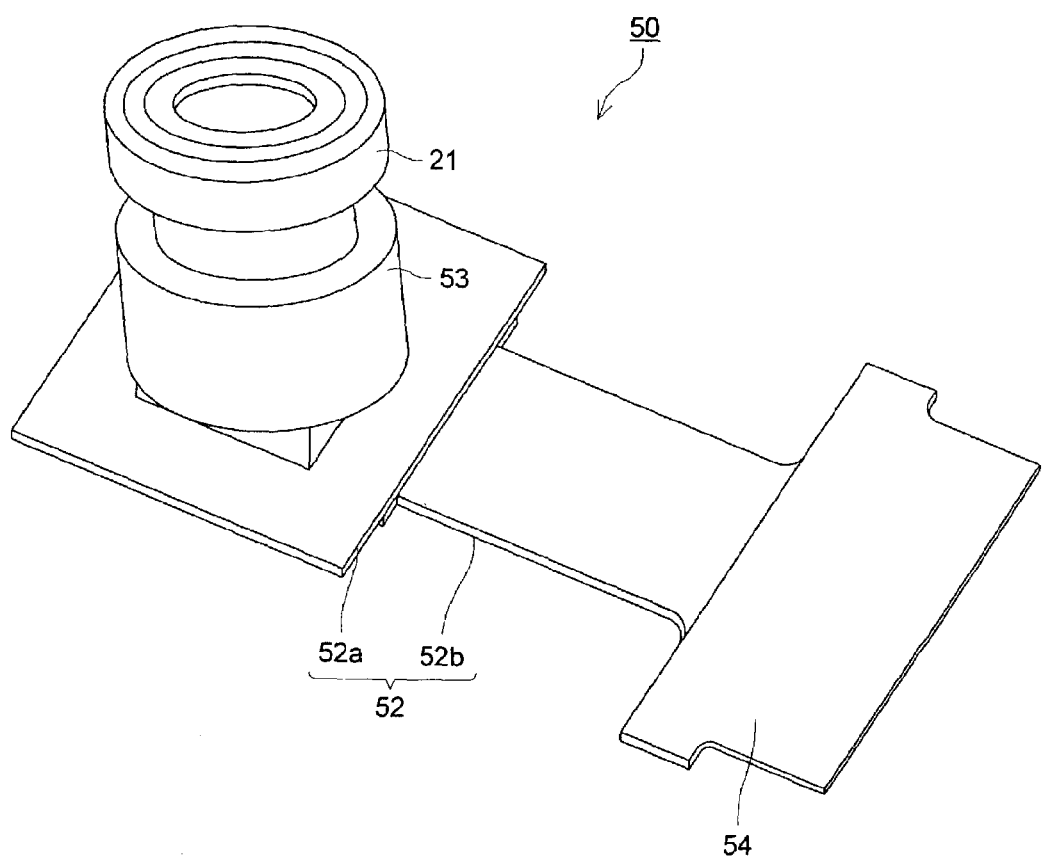
FIG. 2 is a perspective view of an image-capturing unit.

An detailed application embodiment for the image capturing unit of the invention will be explained as follows, referring to FIG. 2 which is a perspective view of image-capturing unit 50 representing the present embodiment. The image-capturing unit 50 is composed of CMOS type image sensor 51 representing an image-capturing device having photoelectric transferring section 51a (a photo-electrically converting section), image-capturing optical system 10 that makes the photoelectric transferring section 51a of the image sensor 51 to capture images, base board 52 having terminal for connection with outside 54 that holds the image sensor 51 and conducts sending and receiving of electric signals and a lens barrel holder 53 to hold a lens barrel that has an aperture for incidence of light from the object side and is composed of light shielding member, which are formed solidly.

With respect to the image sensor 51, photoelectric transferring section (photo-electrically converting section) 51a representing a light receiving section on which pixels (solid-state photoelectric transferring elements or solid-sate image-capturing elements) are arranged in a two-dimensional way is formed at the central portion of the plane on the light-receiving side, and signal processing circuit 51b is formed around photoelectric transferring section 51a. The signal processing circuit is composed of a driving circuit section that drives each pixel in succession and obtains signal electric charges, an A/D converting section that converts each signal electric charge into a digital signal and a signal processing section that forms image signal output by using the digital signal. Further, in the vicinity of an outer edge of the image sensor 51 on the light-receiving side, there are arranged a number of pads (not shown) which are connected to base board 52 through wire W. The image sensor 51 converts signal electric charges coming from photoelectric transferring section 51a into image signals such as digital YUV signals, and outputs them to a prescribed circuit on the base board 52 through wire W. In this case, Y represents a luminance signal, U (=R−Y) represents a color difference signal of red and luminance signal, and V (=B−Y) represents a color difference signal of blue and luminance signal.

Incidentally, the image-capturing device is not limited to an image sensor of the aforesaid CMOS type, and other ones such as CCD may also be used.

The base board 52 is composed of supporting flat plate 52a that supports, on its flat surface, the image sensor 51 and casing 53, and of flexible base board 52b whose end portion is connected to the rear side (the surface opposite to the image sensor 51) of the supporting flat plate 52a.

The supporting flat plate 52a has a number of signal transmission pads provided on its surface and its rear side, and it is connected to wire W of the image sensor 51 on its flat surface side and is connected to the flexible base board 52b on its rear surface side.

The flexible base board 52b is connected, at its one end portion, with the supporting flat plate 52a, and connects the supporting flat plate 52a with an outer circuit (for example, a control circuit that is owned by a superordinate apparatus housing therein an image-capturing unit) through outer output terminal 54 provided on the other end, then, accepts from the outer circuit the supply of voltage and clock signals for driving the image sensor 51, and makes it possible to output digital YUV signals to the output circuit. Further, an intermediate portion of the flexible base board 52b in the longitudinal direction is provided with flexibility or deformability, and its deformability gives the degree of freedom to a direction or arrangement of an outer output terminal for the supporting flat plate 52a.

Figure 4:
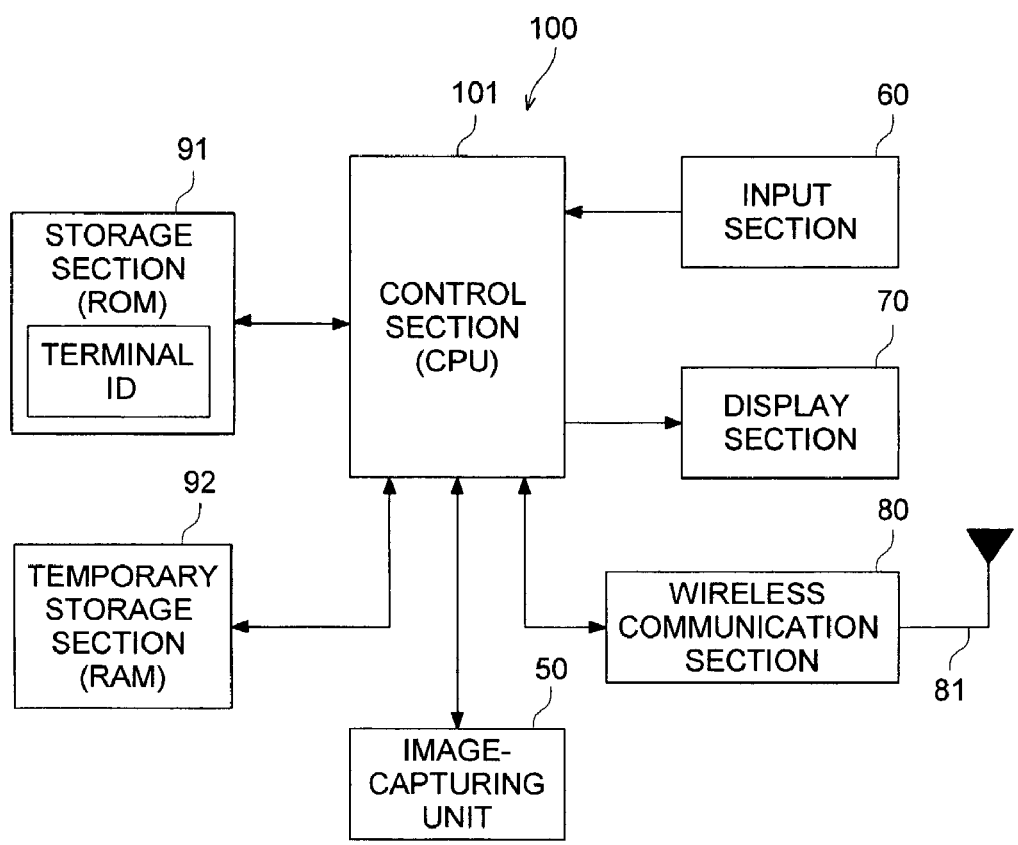
FIG. 4 is a block diagram showing a control unit.

An embodiment to use the image-capturing unit 50 will be explained as follows. FIG. 3 shows how the image-capturing unit 50 is mounted on cell-phone 100 representing a mobile terminal. FIG. 4 is a control block diagram of the cell-phone 100.

For example, the image-capturing unit 50 is provided at the position below the liquid crystal display section, with an end surface of casing 53 on the object side in the image-capturing optical system being provided on the back (a front side is on the liquid crystal display side) of the cell-phone 100.

Outer connection terminal 54 of the image-capturing unit 50 is connected to control section 101 of the cell-phone 100, and outputs image signals such as luminance signals and color difference signals to the control section 101 side.

On the other hand, the cell-phone 100 is composed of control section (CPU) 101 that controls each section collectively and conducts a program corresponding to each processing, input section 60 for support-inputting the numbers by means of a key, display section 70 that displays images captured in addition to prescribed data, wireless communication section 80 for realizing each type of information communication with outer servers, storage section (ROM) 91 storing system programs of cell-phone 100, various types of processing programs and necessary data such as terminal ID and temporary storage section (RAM) 92 used as a work area storing temporarily various types of processing programs, data, or processing data or image-capturing data by image-capturing unit 50 executed by control section 101.

Then, image signals inputted from the image-capturing unit 50 are stored in storage section 92 by the control system of the cell-phone 100, or displayed on the display section 70, or further, transmitted to the outside through wireless communication section 80 as image information.

Next, based on Examples 1–7, there will be explained specifications of an image capturing lens to which, however, the invention is not limited. Symbols used in respective Examples are as follows.

f: Focal length
fB: Back focus
F: F-number
2Y: Diagonal length of an effective image plane (Diagonal length in rectangular light-receiving surface of solid state image-capturing device)
R: Radius of curvature of refracting interface
D: Distance between refracting interfaces
Nd: Refractive index of lens material at d-line
vd: Abbe's number (Abbe constant)

Further, in each Example, a form of the aspherical surface is expressed by the following "Numeral 1", when C represents the vertex curvature, K represents the conic constant, and aspherical surface coefficients are represented by A4, A6, A8, A10 and A12 in rectangular coordinates in which the origin is represented by a vertex of the surface and X axis is represented by the direction of an optical axis;

$$X = \frac{Ch^2}{1+\sqrt{1-(1+K)C^2h^2}} + A_4h^4 + A_6h^6 + A_8h^8 + A_{10}h^{10} + A_{12}h^{12}$$

$$\text{wherein } h = \sqrt{Y^2 + Z^2}$$

(Numeral 1)

FIRST EXAMPLE

Lens data are shown in Tables 1, 2 and 3.

TABLE 1

(Example 1)
f = 3.560 mm fB = 1.617 mm F = 2.82 2Y = 4.24 mm

| Surface No. | R (mm) | D (mm) | Nd | vd |
|---|---|---|---|---|
| Diaphragm | ∞ | 0.20 | | |
| 1 | 3.052 | 1.24 | 1.53040 | 56.0 |
| 2 | −2.078 | 0.41 | | |
| 3 | −0.892 | 0.82 | 1.58300 | 30.0 |
| 4 | −2.639 | 0.20 | | |
| 5 | 1.280 | 1.00 | 1.53040 | 56.0 |
| 6 | 2.150 | | | |

TABLE 2

| | Aspherical surface coefficient |
|---|---|
| First surface | K = −1.6816<br>A4 = −1.0491 × 10$^{-2}$<br>A6 = −3.5682 × 10$^{-2}$<br>A8 = 2.3898 × 10$^{-2}$<br>A10 = −3.9391 × 10$^{-2}$ |
| Second surface | K = 1.1166<br>A4 = 1.6224 × 10$^{-2}$<br>A6 = 1.9824 × 10$^{-2}$<br>A8 = −5.5354 × 10$^{-2}$<br>A10 = 1.7107 × 10$^{-2}$ |
| Third surface | K = −3.2715<br>A4 = −2.7322 × 10$^{-2}$<br>A6 = 7.3636 × 10$^{-2}$<br>A8 = −5.9771 × 10$^{-2}$<br>A10 = −7.7937 × 10$^{-3}$<br>A12 = 1.5014 × 10$^{-2}$ |

TABLE 2-continued

| | Aspherical surface coefficient |
|---|---|
| Fourth surface | K = −1.1677<br>A4 = 3.5006 × $10^{-2}$<br>A6 = 1.5424 × $10^{-2}$<br>A8 = −2.1565 × $10^{-3}$<br>A10 = −2.6532 × $10^{-3}$<br>A12 = 1.1001 × $10^{-3}$ |
| Fifth surface | K = −3.8470<br>A4 = 1.4719 × $10^{-2}$<br>A6 = −1.2455 × $10^{-2}$<br>A8 = 9.7271 × $10^{-4}$<br>A10 = −1.1216 × $10^{-4}$<br>A12 = 4.4541 × $10^{-6}$ |
| Sixth surface | K = −1.2236<br>A4 = −2.3884 × $10^{-2}$<br>A6 = 5.3684 × $10^{-4}$<br>A8 = −3.2130 × $10^{-3}$<br>A10 = 9.0104 × $10^{-4}$<br>A12 = −7.7247 × $10^{-5}$ |

TABLE 3

| | Example 1 |
|---|---|
| (1) L/2Y | 1.30 |
| (2) f1/f | 0.71 |
| (3) f3/f | 1.20 |
| (4) R3/((N2 − 1) · f) | −0.43 |
| (5) ν1 − ν2 | 26.0 |

Figure 5:
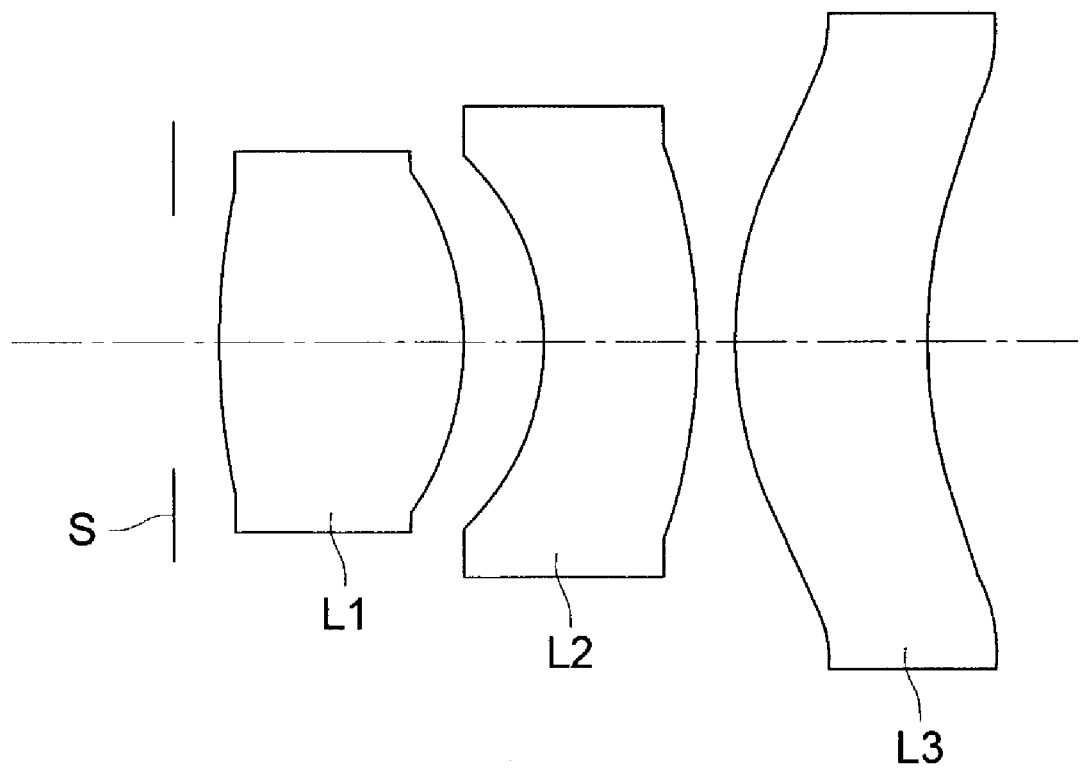
FIG. 5 is an illustration showing an image-capturing lens arrangement in Example 1.
Figure 6:
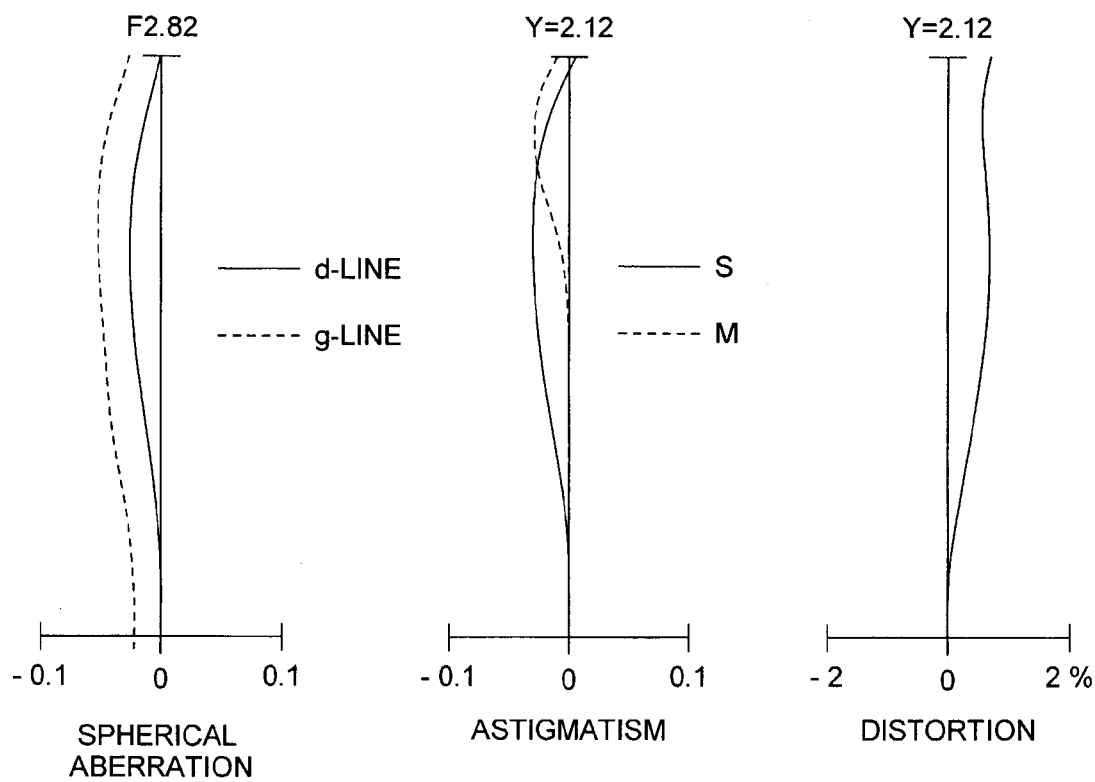
FIG. 6 shows aberration diagrams in Example 1 (spherical aberration, astigmatism, distortion and meridional coma aberration).
Figure 6:
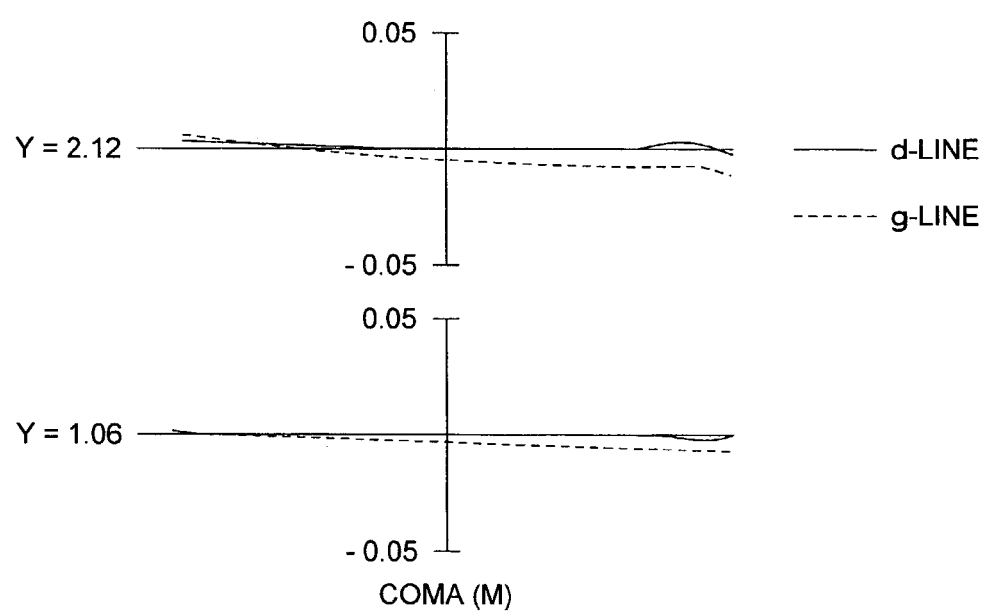

FIG. 5 is an illustration diagram showing an image-capturing lens arrangement of the First Example. In the drawing, L1 represents the first lens, L2 represents the second lens, L3 represents the third lens and S represents an aperture diaphragm. FIG. 6 is a diagram of aberrations in Example 1 (spherical aberration, astigmatism, distortion and meridional coma aberration).

Each of the first lens L1 and the third lens L3 is a plastic lens of a polyolefin type and its percentage of saturated water absorption is 0.01% or less. The second lens L2 is a plastic lens of a polycarbonate type and its percentage of saturated water absorption is 0.4%.

EXAMPLE 2

Lens data are shown in Tables 4, 5 and 6.

TABLE 4

(Example 2)
f = 3.560 mm fB = 1.608 mm F = 2.82 2Y = 4.24 mm

| Surface No. | R (mm) | D (mm) | Nd | νd |
|---|---|---|---|---|
| Diaphragm | ∞ | 0.20 | | |
| 1 | 2.935 | 1.24 | 1.49700 | 56.0 |
| 2 | −1.927 | 0.42 | | |
| 3 | −0.886 | 0.82 | 1.58300 | 30.0 |
| 4 | −2.596 | 0.20 | | |
| 5 | 1.217 | 1.00 | 1.49700 | 56.0 |
| 6 | 2.107 | | | |

TABLE 5

| | Aspherical surface coefficient |
|---|---|
| First surface | K = −1.7943<br>A4 = −1.4869 × $10^{-2}$<br>A6 = −1.0811 × $10^{-2}$<br>A8 = −2.8303 × $10^{-2}$<br>A10 = 1.0732 × $10^{-2}$ |

TABLE 5-continued

| | Aspherical surface coefficient |
|---|---|
| Second surface | K = 1.2219<br>A4 = 4.6746 × $10^{-2}$<br>A6 = 1.7599 × $10^{-2}$<br>A8 = −5.4338 × $10^{-2}$<br>A10 = 2.5193 × $10^{-2}$ |
| Third surface | K = −3.4812<br>A4 = −2.3751 × $10^{-2}$<br>A6 = 7.9632 × $10^{-2}$<br>A8 = −5.7217 × $10^{-2}$<br>A10 = −8.2616 × $10^{-3}$<br>A12 = 1.4117 × $10^{-2}$ |
| Fourth surface | K = −1.3161<br>A4 = 3.5093 × $10^{-2}$<br>A6 = 1.5006 × $10^{-2}$<br>A8 = −2.4508 × $10^{-3}$<br>A10 = −2.4750 × $10^{-3}$<br>A12 = 1.0270 × $10^{-3}$ |
| Fifth surface | K = −3.6750<br>A4 = 1.5979 × $10^{-2}$<br>A6 = −1.1979 × $10^{-2}$<br>A8 = 1.0441 × $10^{-3}$<br>A10 = −1.2424 × $10^{-4}$<br>A12 = −8.4000 × $10^{-6}$ |
| Sixth surface | K = −1.0422<br>A4 = −2.3963 × $10^{-2}$<br>A6 = 3.5702 × $10^{-4}$<br>A8 = −3.2540 × $10^{-3}$<br>A10 = 8.9657 × $10^{-4}$<br>A12 = −7.7167 × $10^{-5}$ |

TABLE 6

| | Example 2 |
|---|---|
| (1) L/2Y | 1.30 |
| (2) f1/f | 0.71 |
| (3) f3/f | 1.17 |
| (4) R3/((N2 − 1) · f) | −0.42 |
| (5) ν1 − ν2 | 26.0 |

Figure 7:
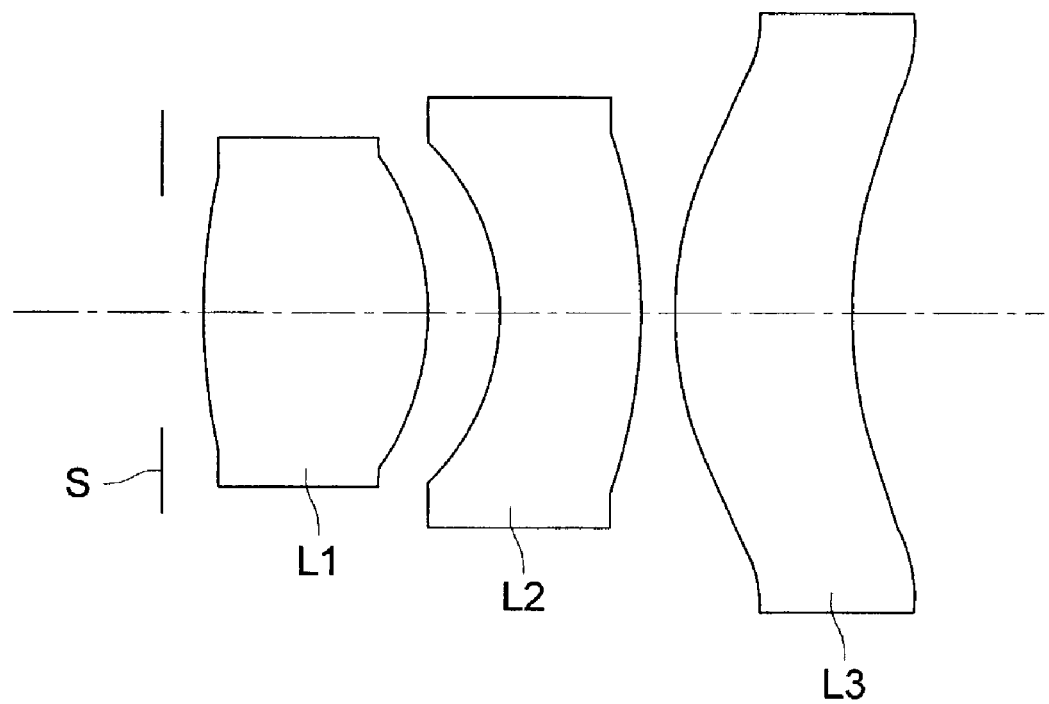
FIG. 7 is an illustration showing an image-capturing lens arrangement in Example 2.
Figure 8:
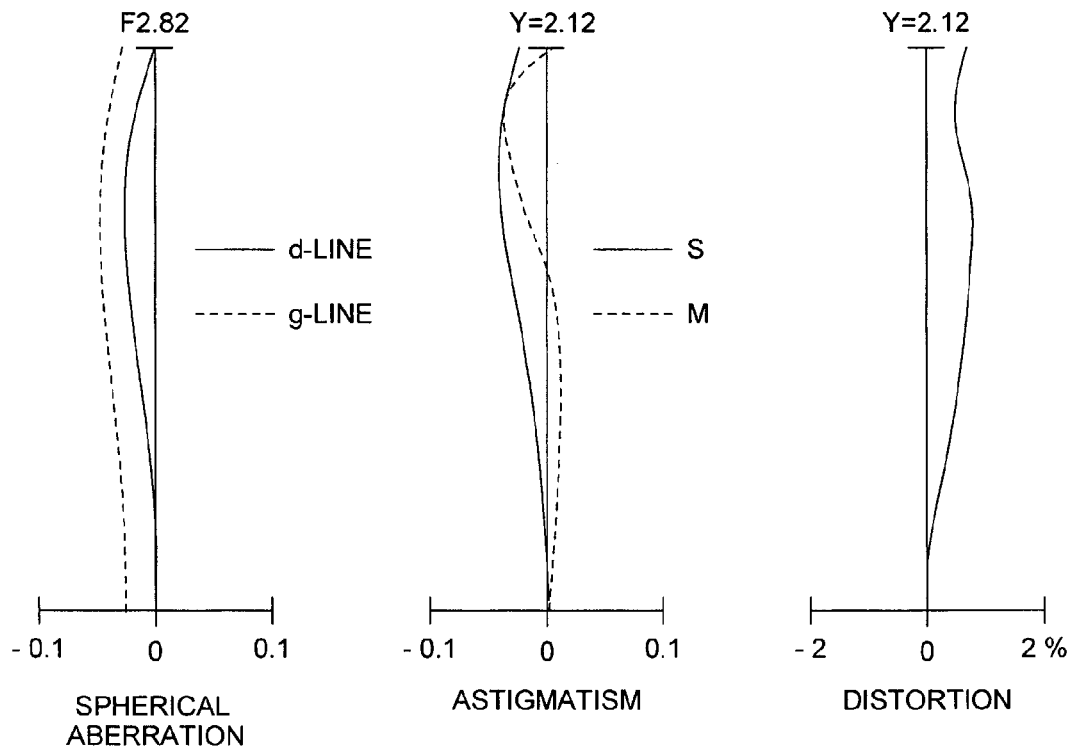
FIG. 8 shows aberration diagrams in Example 2 (spherical aberration, astigmatism, distortion and meridional coma aberration).
Figure 8:
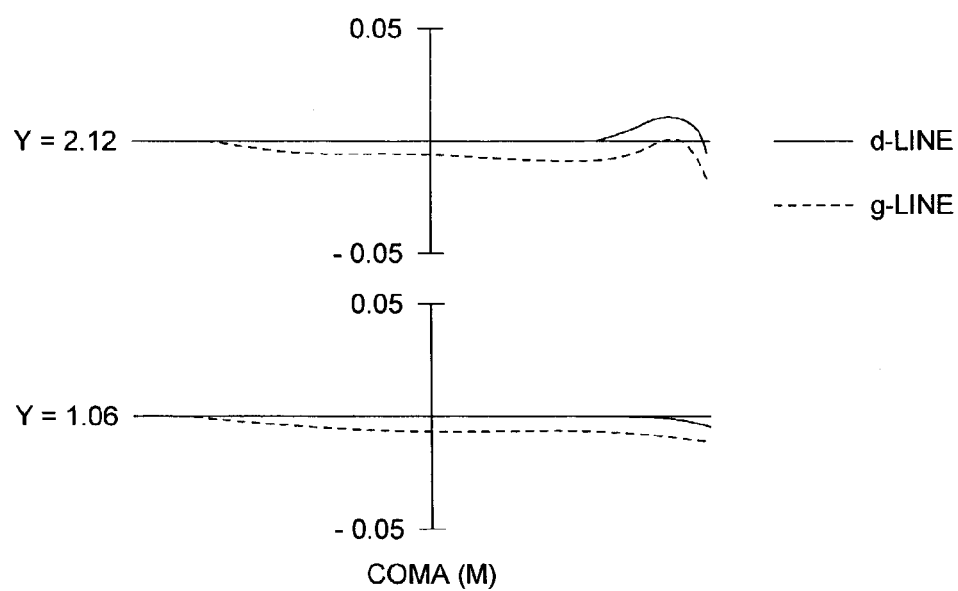

FIG. 7 is an illustration diagram showing an image-capturing lens arrangement of Example 2. In the drawing, L1 represents the first lens, L2 represents the second lens, L3 represents the third lens and S represents an aperture diaphragm. FIG. 8 is a diagram of aberrations in Example 2 (spherical aberration, astigmatism, distortion and meridional coma aberration).

Each of the first lens L1 and the third lens L3 is a plastic lens of an acrylic type and its percentage of saturated water absorption is 1.3%. The second lens L2 is a plastic lens of a polycarbonate type and its percentage of saturated water absorption is 0.4%.

EXAMPLE 3

Lens data are shown in Tables 7, 8 and 9.

TABLE 7

(Example 3)
f = 3.676 mm fB = 0.206 mm F = 2.82 2Y = 4.24 mm

| Surface No. | R (mm) | D (mm) | Nd | νd |
|---|---|---|---|---|
| Diaphragm | ∞ | 0.20 | | |
| 1 | 2.424 | 1.45 | 1.49700 | 56.0 |
| 2 | −2.712 | 0.38 | | |

TABLE 7-continued (Example 3)
f = 3.676 mm fB = 0.206 mm F = 2.82 2Y = 4.24 mm

| Surface No. | R (mm) | D (mm) | Nd | νd |
|---|---|---|---|---|
| 3 | −1.000 | 0.84 | 1.58300 | 30.0 |
| 4 | −2.768 | 0.12 | | |
| 5 | 1.128 | 0.82 | 1.49700 | 56.0 |
| 6 | 1.693 | 1.00 | | |
| 7 | ∞ | 0.70 | 1.54880 | 67.0 |
| 8 | ∞ | | | |

TABLE 8

| | Aspherical surface coefficient |
|---|---|
| First surface | K = 7.64631 × 10$^{-1}$<br>A4 = −7.26845 × 10$^{-3}$<br>A6 = −5.69191 × 10$^{-2}$<br>A8 = 7.54296 × 10$^{-2}$<br>A10 = −4.47161 × 10$^{-2}$<br>A12 = −5.03649 × 10$^{-3}$ |
| Second surface | K = 1.98965<br>A4 = 1.79067 × 10$^{-2}$<br>A6 = −2.68448 × 10$^{-3}$<br>A8 = −6.25013 × 10$^{-2}$<br>A10 = 2.87093 × 10$^{-2}$ |
| Third surface | K = −4.49258<br>A4 = −6.42404 × 10$^{-2}$<br>A6 = 6.50987 × 10$^{-2}$<br>A8 = −6.81812 × 10$^{-2}$<br>A10 = −1.46910 × 10$^{-2}$<br>A12 = 2.26546 × 10$^{-2}$ |
| Fourth surface | K = −3.34513 × 10$^{-1}$<br>A4 = 3.51242 × 10$^{-2}$<br>A6 = 1.14274 × 10$^{-2}$<br>A8 = −2.19831 × 10$^{-3}$<br>A10 = −1.88745 × 10$^{-3}$<br>A12 = 8.06597 × 10$^{-4}$ |
| Fifth surface | K = −3.31732<br>A4 = 1.43480 × 10$^{-2}$<br>A6 = −5.15036 × 10$^{-3}$<br>A8 = −4.56345 × 10$^{-5}$<br>A10 = −3.96209 × 10$^{-4}$<br>A12 = 4.88822 × 10$^{-5}$ |
| Sixth surface | K = −7.81942 × 10$^{-1}$<br>A4 = −5.53581 × 10$^{-2}$<br>A6 = 1.38043 × 10$^{-2}$<br>A8 = −5.21437 × 10$^{-3}$<br>A10 = 4.71073 × 10$^{-4}$<br>A12 = 5.67539 × 10$^{-6}$ |

TABLE 9

| | Example 3 |
|---|---|
| (1) L/2Y | 1.30 |
| (2) f1/f | 0.77 |
| (3) f3/f | 1.25 |
| (4) R3/((N2 − 1) · f) | −0.47 |
| (5) ν1 − ν2 | 26.0 |

Figure 9:
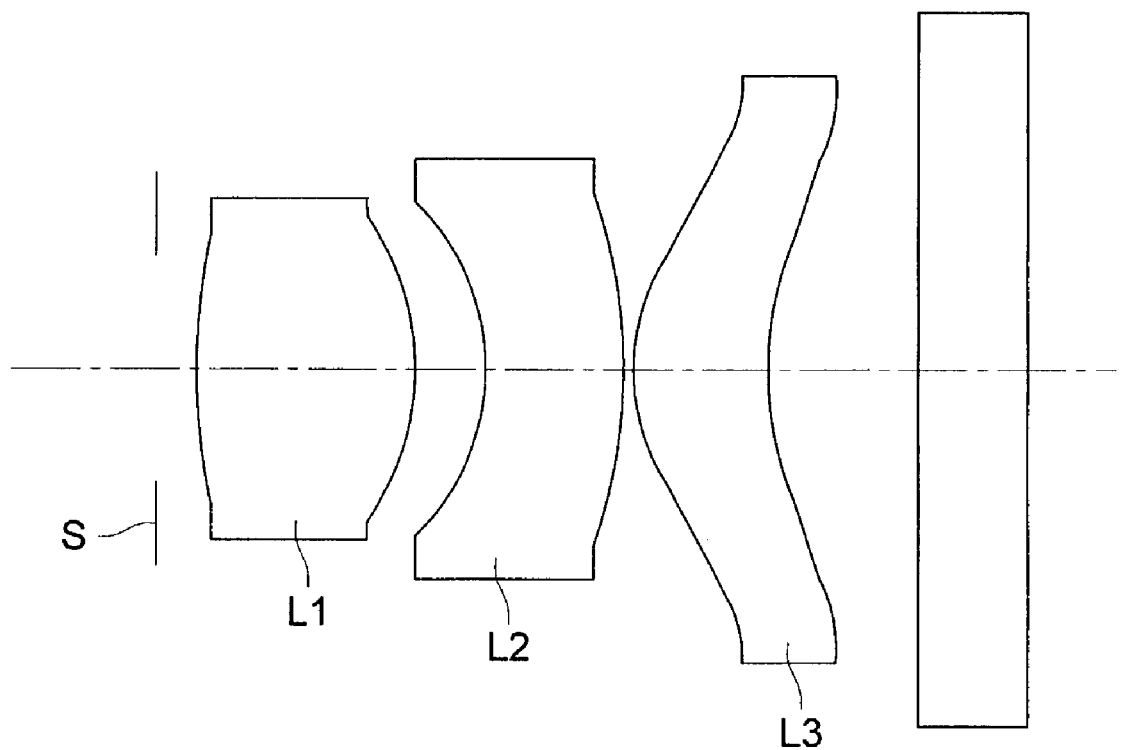
FIG. 9 is an illustration showing an image-capturing lens arrangement in Example 3.
Figure 10:
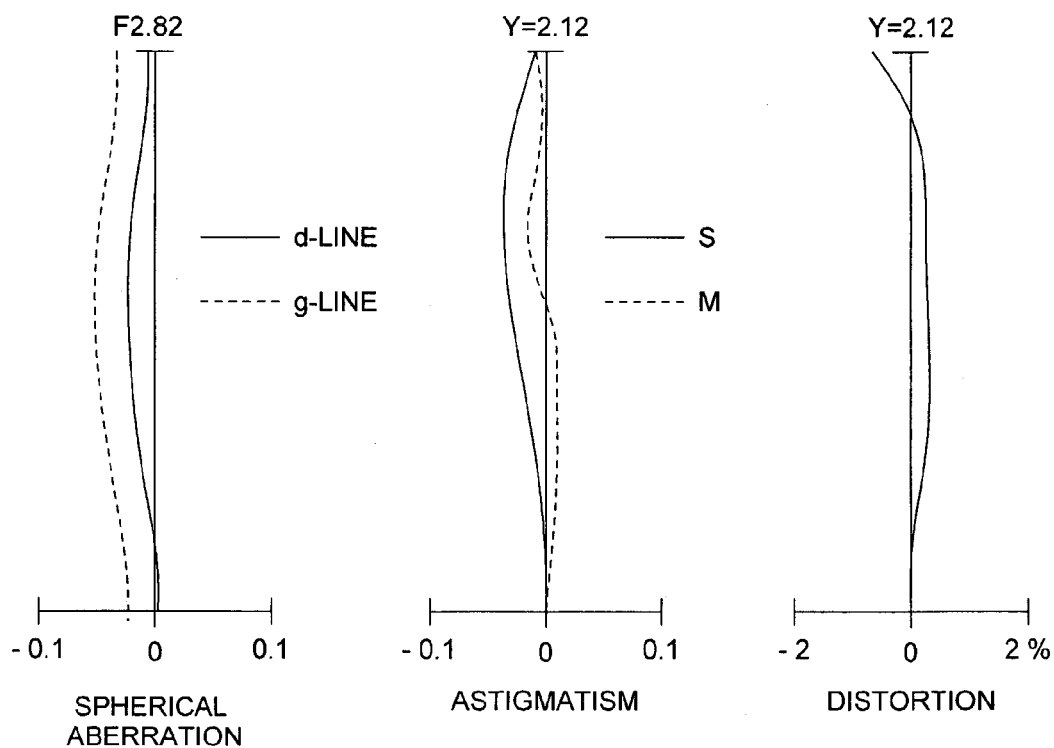
FIG. 10 shows aberration diagrams in Example 3 (spherical aberration, astigmatism, distortion and meridional coma aberration).
Figure 10:
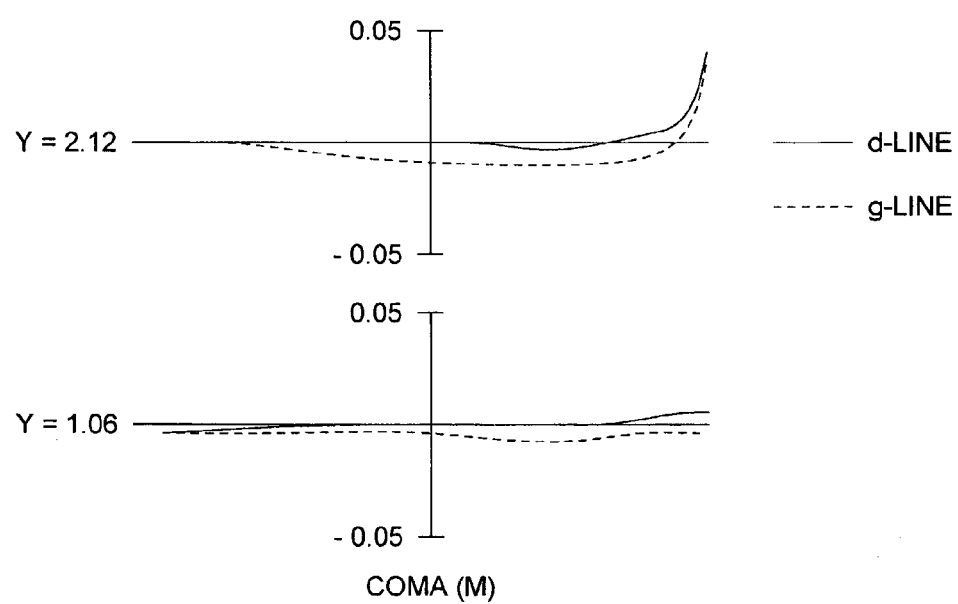

FIG. 9 is an illustration diagram showing an image-capturing lens arrangement of Example 3. In the drawing, L1 represents the first lens, L2 represents the second lens, L3 represents the third lens and S represents an aperture diaphragm. FIG. 10 is a diagram of aberrations in Example 3 (spherical aberration, astigmatism, distortion and meridional coma aberration).

Each of the first lens L1 and the third lens L3 is a plastic lens of an acrylic type and its percentage of saturated water absorption is 1.3%. The second lens L2 is a plastic lens of a polycarbonate type and its percentage of saturated water absorption is 0.4%. Incidentally, the present example is an example of design wherein a plane parallel plate equivalent to a low pass filter made of rock crystal is arranged to be closest to the image.

EXAMPLE 4

Lens data are shown in Tables 10, 11 and 12.

TABLE 10

(Example 4)
f = 4.451 mm fB = 2.078 mm F = 2.82 2Y = 5.42 mm

| Surface No. | R (mm) | D (mm) | Nd | νd |
|---|---|---|---|---|
| Diaphragm | ∞ | 0.20 | | |
| 1 | 3.796 | 1.50 | 1.53040 | 56.0 |
| 2 | −2.602 | 0.51 | | |
| 3 | −1.115 | 1.00 | 1.58300 | 30.0 |
| 4 | −3.299 | 0.25 | | |
| 5 | 1.592 | 1.20 | 1.53040 | 56.0 |
| 6 | 2.698 | | | |

TABLE 11

| | Aspherical surface coefficient |
|---|---|
| First surface | K = −1.7034<br>A4 = −6.3582 × 10$^{-3}$<br>A6 = −1.2005 × 10$^{-2}$<br>A8 = 4.6051 × 10$^{-3}$<br>A10 = −5.7800 × 10$^{-3}$ |
| Second surface | K = 1.4401<br>A4 = 7.6501 × 10$^{-3}$<br>A6 = 6.6607 × 10$^{-3}$<br>A8 = −1.1452 × 10$^{-2}$<br>A10 = 2.3315 × 10$^{-3}$ |
| Third surface | K = −3.2788<br>A4 = −1.4018 × 10$^{-2}$<br>A6 = 2.3991 × 10$^{-2}$<br>A8 = −1.2591 × 10$^{-2}$<br>A10 = −1.0571 × 10$^{-3}$<br>A12 = 1.2895 × 10$^{-3}$ |
| Fourth surface | K = −1.8023<br>A4 = 1.8180 × 10$^{-2}$<br>A6 = 5.0794 × 10$^{-3}$<br>A8 = −4.4435 × 10$^{-4}$<br>A10 = −3.5516 × 10$^{-4}$<br>A12 = 9.4022 × 10$^{-5}$ |
| Fifth surface | K = −3.8573<br>A4 = 7.5242 × 10$^{-3}$<br>A6 = −4.0947 × 10$^{-3}$<br>A8 = 1.9966 × 10$^{-4}$<br>A10 = −1.5656 × 10$^{-5}$<br>A12 = 5.3691 × 10$^{-7}$ |
| Sixth surface | K = −1.2933<br>A4 = −1.2226 × 10$^{-2}$<br>A6 = 1.8232 × 10$^{-4}$<br>A8 = −6.7207 × 10$^{-4}$<br>A10 = 1.2108 × 10$^{-4}$<br>A12 = −6.7354 × 10$^{-6}$ |

TABLE 12

| | Example 4 |
|---|---|
| (1) L/2Y | 1.24 |
| (2) f1/f | 0.71 |
| (3) f3/f | 1.20 |
| (4) R3/((N2 − 1) · f) | −0.43 |
| (5) ν1 − ν2 | 26.0 |

Figure 11:
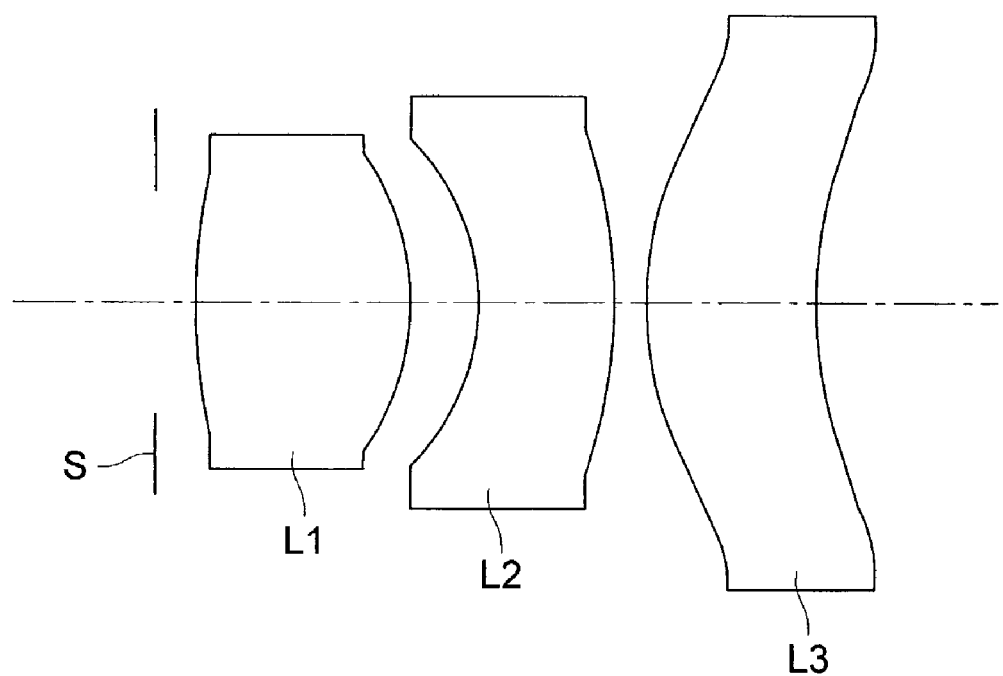
FIG. 11 is an illustration showing an image-capturing lens arrangement in Example 4.
Figure 12:
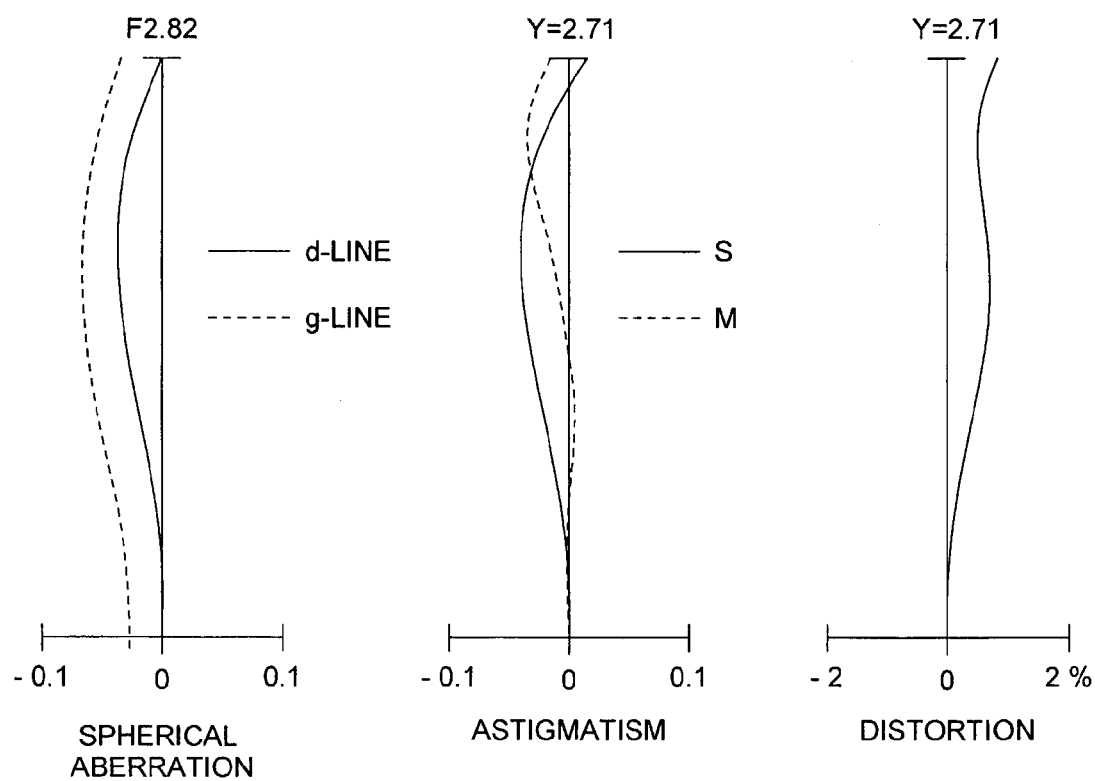
FIG. 12 shows aberration diagrams in Example 4 (spherical aberration, astigmatism, distortion and meridional coma aberration).
Figure 12:
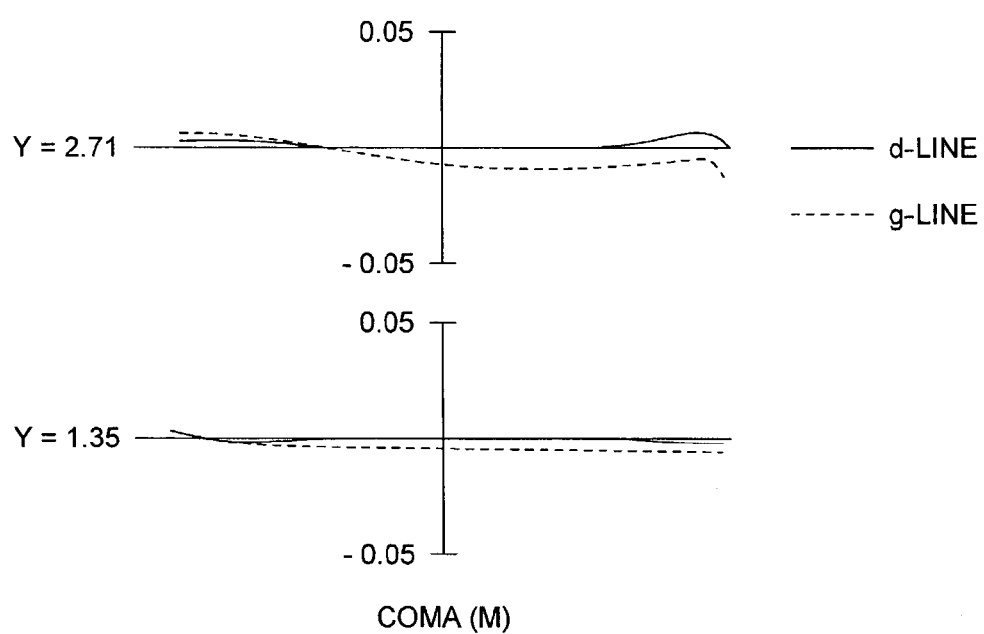

FIG. 11 is a sectional view of an image-capturing lens in Example 4. In the drawing, L1 represents the first lens, L2 represents the second lens, L3 represents the third lens and S represents an aperture diaphragm. FIG. 12 is a diagram of aberrations in Example 4 (spherical aberration, astigmatism, distortion and meridional coma aberration).

Each of the first lens L1 and the third lens L3 is a plastic lens of a polyolefin type and its percentage of saturated water absorption is 0.01% or less. The second lens L2 is a plastic lens of a polycarbonate type and its percentage of saturated water absorption is 0.4%.

FIFTH EXAMPLE

Lens data are shown in Tables 13, 14 and 15.

TABLE 13

(Example 5)
f = 4.298 mm fB = 0.503 mm F = 4.15 2Y = 5.0 mm

| Surface No. | R (mm) | D (mm) | Nd | νd |
|---|---|---|---|---|
| Diaphragm | ∞ | 0.00 | | |
| 1 | 6.859 | 1.20 | 1.58313 | 59.4 |
| 2 | −2.876 | 1.00 | | |
| 3 | −1.211 | 0.80 | 1.60700 | 27.0 |
| 4 | −3.191 | 0.10 | | |
| 5 | 1.309 | 1.12 | 1.52500 | 56.0 |
| 6 | 1.947 | 0.64 | | |
| 7 | ∞ | 0.30 | 1.51633 | 64.1 |
| 8 | ∞ | 0.20 | | |
| 9 | ∞ | 0.45 | 1.51633 | 64.1 |
| 10 | ∞ | | | |

TABLE 14

| | Aspherical surface coefficient |
|---|---|
| First surface | K = 0.375451 |
| | A4 = −3.20099 × $10^{-2}$ |
| | A6 = −8.77267 × $10^{-2}$ |
| | A8 = 4.38838 × $10^{-1}$ |
| | A10 = −7.72154 × $10^{-1}$ |
| Second surface | K = −3.29483 |
| | A4 = −3.96590 × $10^{-2}$ |
| | A6 = −3.49514 × $10^{-2}$ |
| | A8 = 3.22673 × $10^{-2}$ |
| | A10 = −1.38774 × $10^{-2}$ |
| Third surface | K = −6.39263 |
| | A4 = −5.45430 × $10^{-2}$ |
| | A6 = 6.71626 × $10^{-2}$ |
| | A8 = −5.89742 × $10^{-2}$ |
| | A10 = 3.16951 × $10^{-2}$ |
| | A12 = −6.38272 × $10^{-3}$ |
| Fourth surface | K = −0.564923 |
| | A4 = 2.91194 × $10^{-2}$ |
| | A6 = 9.95040 × $10^{-3}$ |
| | A8 = −3.16406 × $10^{-3}$ |
| | A10 = 6.04822 × $10^{-4}$ |
| | A12 = −1.51858 × $10^{-5}$ |
| Fifth surface | K = −4.25824 |
| | A4 = −2.17915 × $10^{-3}$ |
| | A6 = −1.18080 × $10^{-3}$ |
| | A8 = 1.55145 × $10^{-4}$ |
| | A10 = 5.72196 × $10^{-5}$ |
| | A12 = −1.12386 × $10^{-5}$ |
| Sixth surface | K = −4.21390 |
| | A4 = −2.39973 × $10^{-2}$ |
| | A6 = 5.44891 × $10^{-3}$ |
| | A8 = −1.51952 × $10^{-3}$ |
| | A10 = 2.57636 × $10^{-4}$ |
| | A12 = −1.81089 × $10^{-5}$ |

TABLE 15

| | Example 5 |
|---|---|
| (1) L/2Y | 1.21 |
| (2) f1/f | 0.85 |
| (3) f3/f | 1.11 |
| (4) R3/((N2 − 1) · f) | −0.46 |
| (4) ν1 − ν2 | 32.4 |
| (5) P23/P | −0.20 |

Figure 13:
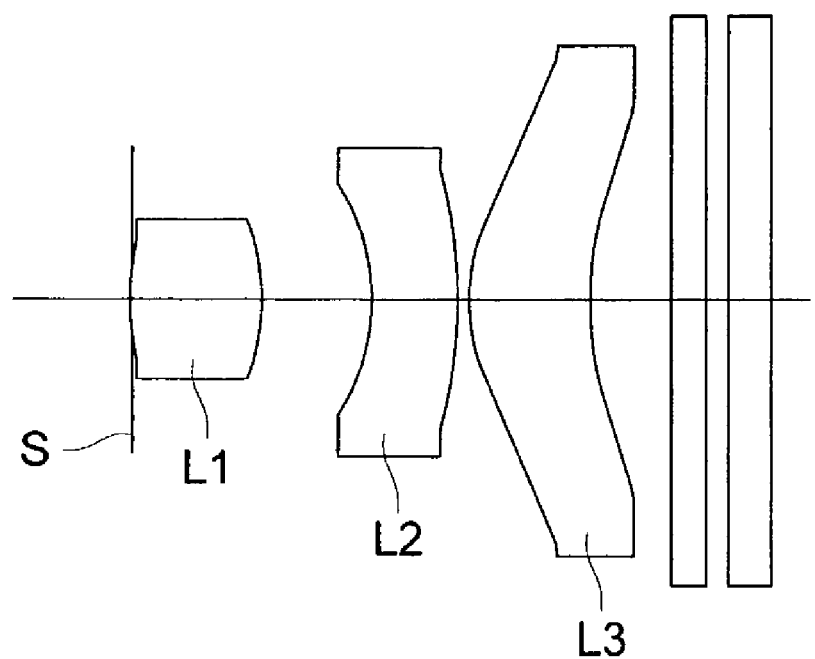
FIG. 13 is an illustration showing an image-capturing lens arrangement in Example 5.
Figure 14:
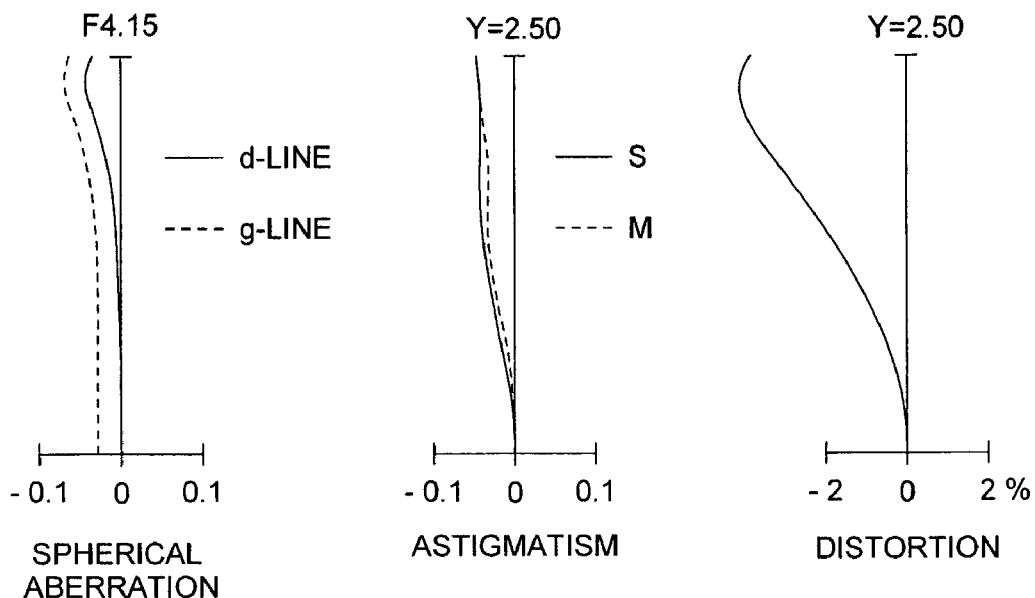
FIG. 14 shows aberration diagrams in Example 5 (spherical aberration, astigmatism, distortion and meridional coma aberration).
Figure 14:
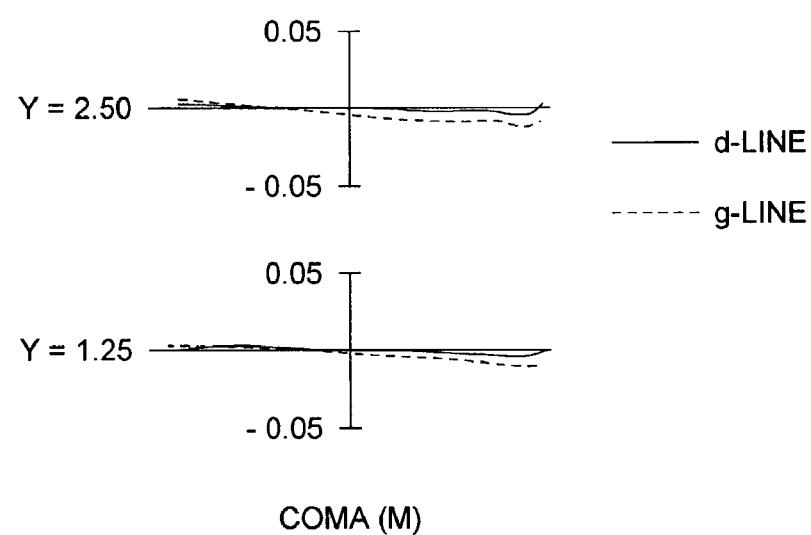

FIG. 13 is an illustration diagram showing an image capturing lens arrangement of the Fifth Example. In the drawing, L1 represents the first lens, L2 represents the second lens, L3 represents the third lens and S represents an aperture diaphragm. FIG. 14 is a diagram of aberrations in Example 5 (spherical aberration, astigmatism, distortion and meridional coma).

The first lens L1 is a glass lens, the second lens is a plastic lens of a polyester type having a percentage of saturated water absorption of 0.7% and the third lens L3 is a plastic lens of a polyolefin type having a percentage of saturated water absorption of 0.01% or less.

This example is a design sample in which at the position closest to the image side, there are provided parallel flat plates corresponding to an infrared ray cut filter and a seal glass for a solid-sate image capturing element.

SIXTH EXAMPLE

Lens data are shown in Tables 16, 17 and 18.

TABLE 16

(Example 6)
f = 4.298 mm fB = 0.504 mm F = 4.15 2Y = 5.0 mm

| Surface No. | R (mm) | D (mm) | Nd | νd |
|---|---|---|---|---|
| Diaphragm | ∞ | 0.00 | | |
| 1 | 2.433 | 1.12 | 1.58313 | 59.4 |
| 2 | −14.773 | 0.74 | | |
| 3 | −1.224 | 0.80 | 1.60700 | 27.0 |
| 4 | −2.926 | 0.10 | | |
| 5 | 1.473 | 1.18 | 1.52500 | 56.0 |
| 6 | 2.263 | 0.47 | | |
| 7 | ∞ | 0.30 | 1.51633 | 64.1 |
| 8 | ∞ | 0.20 | | |
| 9 | ∞ | 0.45 | 1.51633 | 64.1 |
| 10 | ∞ | | | |

TABLE 17

| | Aspherical surface coefficient |
|---|---|
| First surface | K = 5.47631 |
| | A4 = −5.88427 × $10^{-2}$ |
| | A6 = −1.01490 × $10^{-1}$ |
| | A8 = 3.29430 × $10^{-1}$ |
| | A10 = −6.56990 × $10^{-1}$ |
| Second surface | K = −49.9730 |
| | A4 = −3.98723 × $10^{-2}$ |
| | A6 = −8.65969 × $10^{-2}$ |
| | A8 = 5.89891 × $10^{-2}$ |
| | A10 = −5.34386 × $10^{-2}$ |
| Third surface | K = −6.30911 |
| | A4 = −1.57620 × $10^{-1}$ |
| | A6 = 3.95791 × $10^{-2}$ |
| | A8 = −9.27235 × $10^{-2}$ |
| | A10 = 1.10077 × $10^{-2}$ |
| | A12 = −7.06172 × $10^{-3}$ |

TABLE 17-continued

| | Aspherical surface coefficient |
|---|---|
| Fourth surface | K = 1.87037 |
| | A4 = 6.88364 × 10⁻³ |
| | A6 = 1.45143 × 10⁻² |
| | A8 = −3.81261 × 10⁻³ |
| | A10 = 1.49218 × 10⁻³ |
| | A12 = 2.61317 × 10⁻⁴ |
| Fifth surface | K = −5.33572 |
| | A4 = −1.05776 × 10⁻² |
| | A6 = 3.53470 × 10⁻⁴ |
| | A8 = 2.38176 × 10⁻⁴ |
| | A10 = −2.25288 × 10⁻⁶ |
| | A12 = −7.62576 × 10⁻⁶ |
| Sixth surface | K = −4.81074 |
| | A4 = −3.27214 × 10⁻² |
| | A6 = 6.34048 × 10⁻³ |
| | A8 = −1.53677 × 10⁻³ |
| | A10 = 2.48125 × 10⁻⁴ |
| | A12 = −1.77393 × 10⁻⁵ |

TABLE 18

| | Example 6 |
|---|---|
| (1) L/2Y | 1.12 |
| (2) f1/f | 0.85 |
| (3) f3/f | 1.23 |
| (4) R3/((N2 − 1) · f) | −0.47 |
| (4) ν1 − ν2 | 32.4 |
| (5) P23/P | −0.17 |

Figure 15:
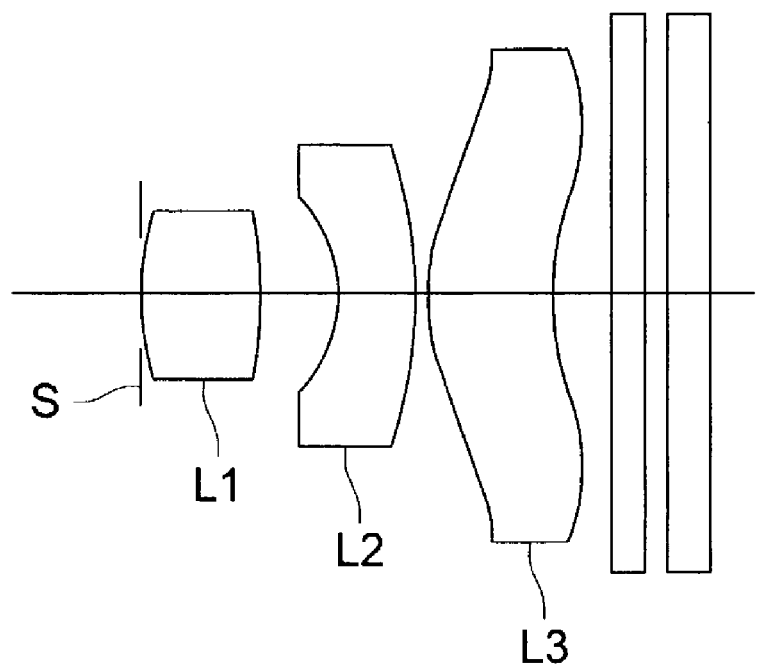
FIG. 15 is an illustration showing an image-capturing lens arrangement in Example 6.
Figure 16:
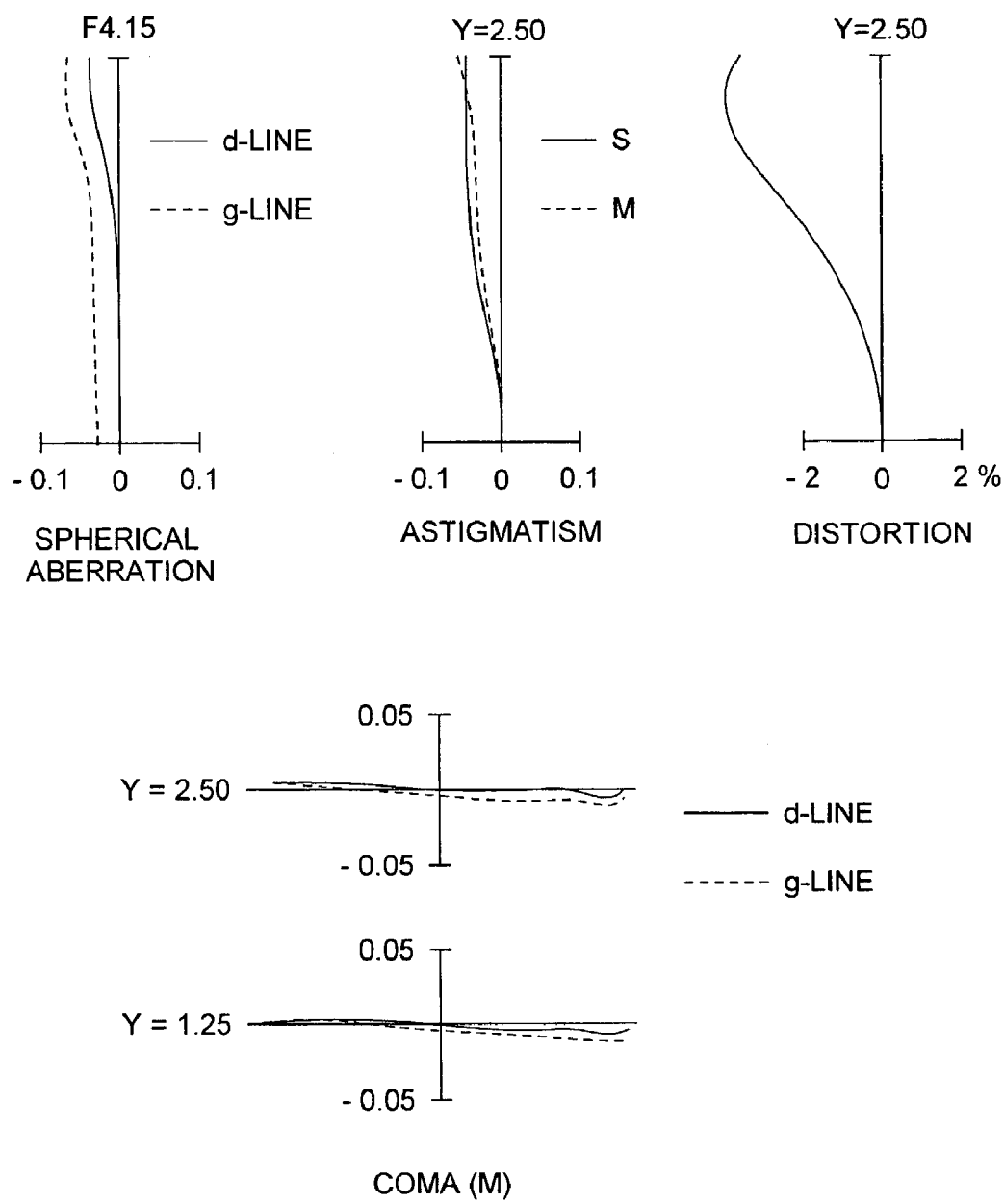
FIG. 16 shows aberration diagrams in Example 6 (spherical aberration, astigmatism, distortion and meridional coma aberration).

FIG. 15 is an illustration diagram showing an image capturing lens arrangement of the Sixth Example. In the drawing, L1 represents the first lens, L2 represents the second lens, L3 represents the third lens and S represents an aperture diaphragm. FIG. 16 is a diagram of aberrations in Example 6 (spherical aberration, astigmatism, distortion and meridional coma).

The first lens L1 is a glass lens, the second lens is a plastic lens of a polyester type having a saturation water absorption of 0.7% and the third lens L3 is a plastic lens of a polyolefin type having a saturation water absorption of 0.01% or less.

This example is a design sample in which at the position closest to the image side, there are provided parallel flat plates corresponding to an infrared ray cut filter and a seal glass for a solid-sate image capturing element.

SEVENTH EXAMPLE

Lens data are shown in Tables 19, 20 and 21.

TABLE 19

(Example 7)
f = 4.350 mm fB = 0.518 mm F = 4.15 2Y = 5.0 mm

| Surface No. | R (mm) | D (mm) | Nd | νd |
|---|---|---|---|---|
| Diaphragm | ∞ | 0.00 | | |
| 1 | 3.239 | 1.10 | 1.52500 | 56.0 |
| 2 | −1.997 | 0.58 | | |
| 3 | −0.876 | 0.70 | 1.60700 | 27.0 |
| 4 | −2.667 | 0.52 | | |
| 5 | 1.576 | 1.30 | 1.52500 | 56.0 |
| 6 | 2.566 | 0.40 | | |
| 7 | ∞ | 0.30 | 1.51633 | 64.1 |
| 8 | ∞ | 0.20 | | |
| 9 | ∞ | 0.45 | 1.51633 | 64.1 |
| 10 | ∞ | | | |

TABLE 20

| | Aspherical surface coefficient |
|---|---|
| First surface | K = −3.20933 |
| | A4 = −3.82364 × 10⁻² |
| | A6 = −2.63801 × 10⁻² |
| | A8 = −6.10239 × 10⁻² |
| | A10 = 1.83338 × 10⁻² |
| Second surface | K = 1.90458 |
| | A4 = −4.63123 × 10⁻² |
| | A6 = −1.97770 × 10⁻² |
| | A8 = 6.47328 × 10⁻² |
| | A10 = −4.45104 × 10⁻² |
| Third surface | K = −2.39028 |
| | A4 = −2.30131 × 10⁻¹ |
| | A6 = 2.17675 × 10⁻¹ |
| | A8 = 1.70144 × 10⁻¹ |
| | A10 = −3.53937 × 10⁻¹ |
| | A12 = 1.51751 × 10⁻¹ |
| Fourth surface | K = 1.70050 |
| | A4 = −6.05383 × 10⁻² |
| | A6 = 1.25158 × 10⁻¹ |
| | A8 = −1.45910 × 10⁻² |
| | A10 = −1.18824 × 10⁻² |
| | A12 = 3.53296 × 10⁻³ |
| Fifth surface | K = −5.22303 |
| | A4 = −3.24548 × 10⁻² |
| | A6 = 4.83320 × 10⁻³ |
| | A8 = 2.02980 × 10⁻⁴ |
| | A10 = −2.19007 × 10⁻⁴ |
| | A12 = 1.07363 × 10⁻⁵ |
| Sixth surface | K = −1.26552 |
| | A4 = −5.77008 × 10⁻² |
| | A6 = 7.93873 × 10⁻³ |
| | A8 = −1.12663 × 10⁻³ |
| | A10 = 1.17517 × 10⁻⁴ |
| | A12 = −9.43985 × 10⁻⁶ |

TABLE 21

| | Example 7 |
|---|---|
| (1) L/2Y | 1.16 |
| (2) f1/f | 0.58 |
| (3) f3/f | 1.23 |
| (4) R3/((N2 − 1) · f) | −0.33 |
| (5) ν1 − ν2 | 29.0 |

Figure 17:
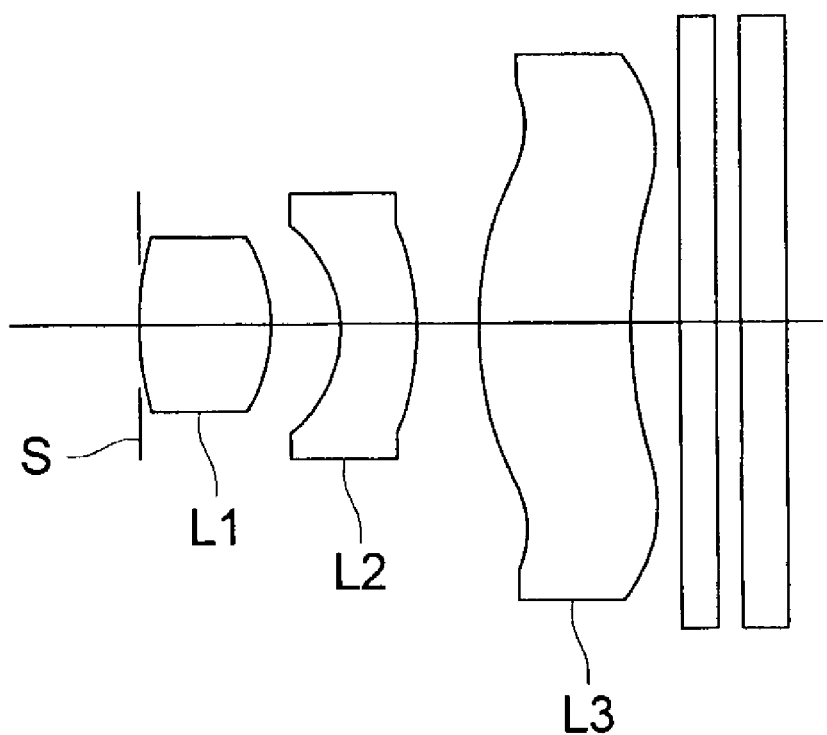
FIG. 17 is an illustration showing an image-capturing lens arrangement in Example 7.
Figure 18:
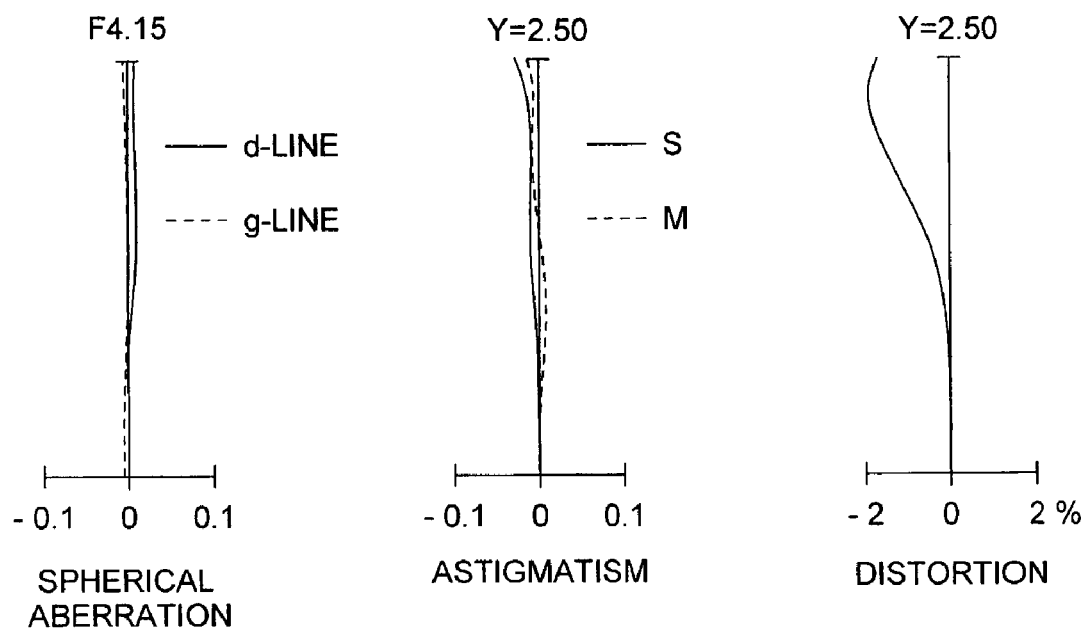
FIG. 18 shows aberration diagrams in Example 7 (spherical aberration, astigmatism, distortion and meridional coma aberration).
Figure 18:
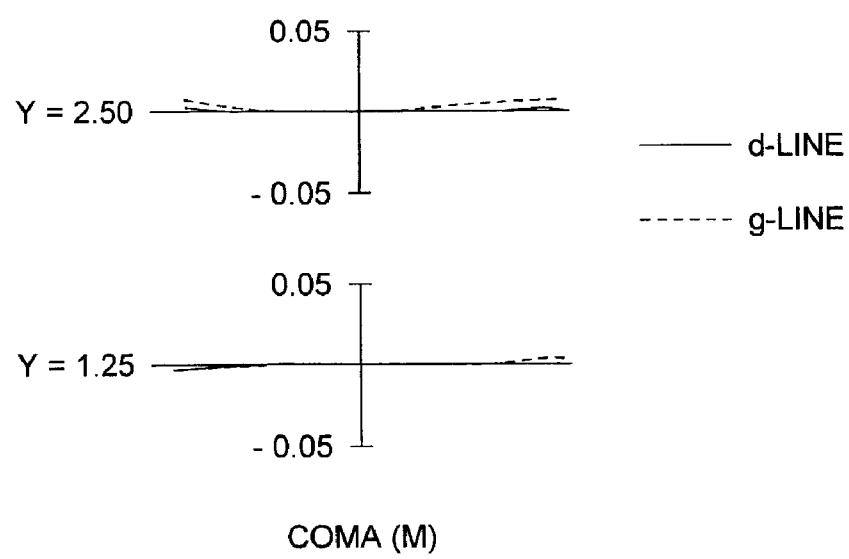

FIG. 17 is an illustration diagram showing an image capturing lens arrangement of the Seventh Example. In the drawing, L1 represents the first lens, L2 represents the second lens, L3 represents the third lens and S represents an aperture diaphragm. FIG. 18 is a diagram of aberrations in Example 7 (spherical aberration, astigmatism, distortion and meridional coma).

The first lens L1 and the third lens L3 are a plastic lens of a polyolefin type having a saturation water absorption of 0.01% or less, and the second lens is a plastic lens of a polyester type having a saturation water absorption of 0.7%.

This example is a design sample in which at the position closest to the image side, there are provided parallel flat plates corresponding to an infrared ray cut filter and a seal glass for a solid-sate image capturing element.

Incidentally, the present example is not always of a sufficient design for telecentric characteristics of an image-side light flux. The telecentric characteristics mean that a principal ray of a light flux for each image point becomes to be almost parallel to an optical axis after emerging from the final surface of the image-capturing lens, namely, that a position of the exit pupil of the optical system is sufficiently away from the image surface. When the telecentric characteristics are deteriorated, a light flux enters an image-capturing device obliquely, causing a phenomenon that substantial aperture efficiency is reduced on the peripheral portion of the image area (shading), which results in shortage of brightness of the edge of image field. In the latest technology, however, it is possible to reduce the shading phenomenon by review of arrangement of a color filter and micro-lens array of the solid state image-capturing device. The present example, therefore, is an example of the design aiming at downsizing equivalent to easing of demands for telecentric characteristics.

The invention described in Item 1 makes it possible to secure image-side telecentric characteristics necessary for a solid state image-capturing device, when the invention is used as an image-capturing lens for the solid state image-capturing device, for example, because a position of the exit pupil can be made to be away from the image surface by arranging the aperture-stop to be closest to the object.

Further, since the positive first lens of a double-convex form having a relatively large refracting power and the negative second lens are arranged on the forefront side toward the object, downsizing of the total image-capturing lens length is aimed in the invention.

By making the first lens to be of the double-convex form, reduction of spherical aberration that is caused when the first lens having great refracting power is used is sought.

Further, by making the concave surface of the negative second lens to face the first lens, the second lens can be arranged to be close to the first lens whose convex surface faces the second lens, which makes it possible to correct properly and simply various aberrations such as spherical aberration, coma aberration and chromatic aberration.

Since the third lens is made to be of a meniscus form wherein the convex surface faces the object, telecentric characteristics on the peripheral portion on the image side can be properly secured.

Based on the foregoing, the invention can reduce effectively various aberrations such as spherical aberration, coma aberration and chromatic aberration, and can provide an image-capturing lens wherein downsizing in the direction of an optical axis is realized, while maintaining telecentric characteristics properly.

The invention described in Item 2 is of the image-capturing lens construction of the so-called triplet type because of its structure wherein the third lens has positive refracting power, and it is possible to correct various abaxial aberrations such as distortion and to secure telecentric characteristics.

The invention described in Item 3 makes it possible to correct spherical aberration and coma aberration by employing aspherical surface on the first positive lens, and to correct coma aberration and astigmatism by employing aspherical surface on the second negative lens.

Further, in the third positive lens, it is possible to correct various aberrations on the peripheral portion of the image area by an aspherical surface without affecting the axial performances, by utilizing a difference in a height of passing between axial ray of light and peripheral ray of light, that difference being caused by the third positive lens positioned to be closest to the image surface. In particular, it is possible to correct effectively the pincushion distortion that is caused when the negative refracting power of the second lens is set to be strong, and to correct the curvature of the field. In other words, it is also possible to make the negative refracting power of the second lens to be strong.

Accordingly, the invention makes it possible to correct aberrations properly.

The invention described in Item 4 makes it possible to shorten the total image-capturing lens length and to make an outside diameter of the image-capturing lens small as a synergy effect, by setting not to exceed the upper limit value in the conditional expression (1) that prescribes the total image-capturing lens length and attains downsizing. Due to this, therefore, the total image-capturing apparatus can be made to be small in size and to be light in weight.

It is further possible to restrain an increase in positive refracting power of the first lens and to control spherical aberration and coma aberration which are caused on the first lens to be small by setting to exceed the lower limit value in the conditional expression (2) that prescribes positive refracting power of the first lens. Further, a radius of curvature which is too small is not generated, which is preferable from the viewpoint of easy processing of an image-capturing lens. On the other hand, by setting not to exceed the upper limit value of the expression (2), an excessive decline of refracting power of the first lens is controlled, which is advantageous for downsizing of the total image-capturing lens length.

Further, by setting to exceed the lower limit value of the conditional expression (3) that prescribes refracting power of the third positive lens, an excessive increase of positive refracting power of the third lens is restrained, which makes distribution of positive refracting power between the first lens and the third lens to be appropriate, and makes downsizing of the total image-capturing lens length possible. On the other hand, by setting not to exceed the upper limit value, an excessive decline of positive refracting power of the third lens is prevented, distortion can be corrected properly and telecentric characteristics of the image-side light flux can be secured.

In the invention described in Item 5, when the value of $R3/((N2-1) \cdot f)$ is higher than the lower limit, negative refracting power of the second lens on the object side does not grow to be greater than is needed, and it is possible to restrain generation of coma flare of abaxial light flux, which makes it possible to obtain excellent image quality. On the other hand, when the value of $R3/((N2-1) \cdot f)$ is lower than the upper limit, negative refracting power of the second lens on the object side can be maintained. Therefore, positive Petzval sum is reduced, and curvature of the field can be corrected easily. Further, spherical aberration and coma aberration caused on the first positive lens can be corrected properly.

The invention described in Item 6 makes it possible to correct axial chromatic aberration and lateral chromatic aberration in a well-balanced way, by setting to exceed the lower limit value of the conditional expression (5) for correcting chromatic aberration on the first positive lens and the second negative lens.

In the invention described in Item 7, all of the first lens, the second lens and the third lens are constituted by a plastic lens manufactured through injection molding. Therefore, mass production is possible for these lenses each of which is small in terms of a radius of curvature and an outside diameter, which is different from lenses manufactured through smoothing and polishing processing.

Further, since it is easy to form an aspherical surface on a plastic lens, correction of aberrations can be conducted more easily and accurately.

In addition, another merit of using a plastic lens is that the number of parts to be mounted can be reduced because a form of the flange portion that is outside the effective diameter of the image-capturing lens can be designed freely. Due to this, it is possible to improve assembling accuracy for the optical system, by employing the structure wherein errors of mounting can be reduced effectively and an optical axis of each lens can easily be made to be in accord with others by utilizing. Further, assembling is made to be easy and productivity is improved.

In the invention described in Item 8, it is possible to prevent lack of uniformity of refractive index caused by sudden changes of humidity and to obtain an advantage of a plastic lens while keeping better image forming ability, by using plastic materials having saturation water absorption of 0.7% or less for each lens.

In the invention described in Item 9, it is therefore preferable to arrange a light shielding mask that regulates a peripheral light flux in at least one of the two spaces between lenses. Owing to this, only a light flux necessary for image forming is allowed to pass, and incidence of light to a flange portion can be restrained to the minimum, resulting in control of generation of ghost and flare.

In the invention described in Item 10, the first positive lens is made of glass material and the second negative lens and the third positive lens are made of plastic material. By making the first lens having relatively large positive refracting power to be a glass lens, it is possible to ignore a change in refractive index of the first lens in temperature changes, and to build a construction wherein a variation of an image point position of the total image-capturing lens system caused by temperature changes can be restrained to be small.

Further, by employing a glass lens for the first lens, it is not necessary to make a plastic lens that is easily scratched to be exposed, which is a preferable structure.

In the invention described in Item 11, by making the composite focal length of the second and third lenses to be large so that a conditional expression may be satisfied, it is possible to make contribution to variation of image point position of plastic lens caused by temperature changes by the second negative lens and that by the third positive lens to cancel each other, thus, it is possible to control the variation of image point position caused by temperature changes to be small.

In the invention described in Item 12, the same function of Item (8) can be obtained.

In the invention described in Item 13, the same function of Item (9) can be obtained.

In the invention described in Item 14, a miniature and high performance image capturing device can be obtained.

In the invention described in Item 15, it is possible to obtain an image-capturing unit having an advantage of downsizing and high image quality, by using image-capturing lenses in Items 1–13.

In the invention described in Item 16, it is possible to obtain a small-sized mobile terminal capable of capturing images with high image quality, by carrying the image-capturing unit of Item 15.

What is claimed is:

1. An image capturing lens to capture an image of an object, comprising:
    an aperture diaphragm having an aperture through which an image is captured;
    a first lens having a positive refracting power, wherein both surfaces of the first lens are shaped in a convex form;
    a second lens having a negative refracting power, wherein an object-side surface of the second lens is shaped a concave form; and
    a third lens which is a meniscus lens whose convex surface faces toward the object side;
    wherein the aperture diaphragm, the first lens, the second lens and the third lens are aligned in this order from the object side.

2. The image capturing lens of claim 1, wherein the third lens has a positive refractive power.

3. The image capturing lens of claim 1, wherein each of the first, second and third lenses has an aspherical surface on at least one surface thereof.

4. The image capturing lens of claim 1, wherein the following conditional formulas are satisfied:

$$L/2Y<1.50$$

$$0.50<f1/f<0.95$$

$$1.00<f3/f<1.40$$

where L is a distance on the optical axis from the aperture diaphragm to an image side focal point, 2Y is the length of a diagonal line on an effective image screen, f1 is the focal length of the first lens, f3 is the focal length of the third lens and f is the focal length of an entire image capturing lens.

5. The image capturing lens of claim 1, wherein the following conditional formulas are satisfied:

$$-0.60<R3/((N2-1)\cdot f)<-0.20$$

where N2 is the refractive index of the second lens for d-line, R3 is the radius of curvature of the second lens on the object side, and f is the focal length of an entire image capturing lens.

6. The image capturing lens of claim 1, wherein the following conditional formulas is satisfied:

$$25<v1-v2$$

where v1 is the Abbe constant of the first lens and v2 is the Abbe constant of the second lens.

7. The image capturing lens of claim 1, wherein each of the first, second and third lenses is made of a plastic material.

8. The image capturing lens of claim 7, wherein the plastic material has a percentage of saturated water absorption of 0.7% or less.

9. The image capturing lens of claim 7, further comprising:
    a light shielding mask provided in at least one of a space between the first lens and the second lens and a space between the second lens and the third lens and to regulate a peripheral light flux.

10. The image capturing lens of claim 1, wherein the first lens is made of a glass material and each of the second and third lenses is made of a plastic material.

11. The image capturing lens of claim 10, wherein the following conditional formulas is satisfied:

$$f/|f23|<0.4$$

where |f23| is a compound focal length of the second and third lenses and f is the focal length of an entire image capturing lens.

12. The image capturing lens of claim 10, wherein each of the second and third lenses is made of a plastic material having a percentage of saturated water absorption of 0.7% or less.

13. The image capturing lens of claim 10, further comprising:
    a light shielding mask provided in at least one of a space between the first lens and the second lens and a space between the second lens and the third lens and to regulate a peripheral light flux.

14. An image capturing device, comprises:

a solid-state image capturing element including a photo-electrically converting section; and the image capturing lens described in any one of claims 1 to 13 and to form an image of an object on the photo-electrically converting section of the solid-state image capturing element.

15. An image capturing unit, comprising:

a solid-sate image capturing element including a photo-electrically converting section;

an image capturing lens described in any one of claims 1 to 13 and to focus an image of an object onto the photo-electrically converting section of the solid-sate image capturing element;

a base board to support the solid-sate image capturing element and including a terminal for an external connection to transmit and receive electrical signals; and a housing having an opening section through which image light comes from an object side to be incident in and a light shielding member, wherein the solid-sate image capturing element and the image capturing lens are provided in the housing mounted on the base board so at to form a single body and the image capturing unit has a height of 10 mm or less along the optical axis.

16. A portable terminal device provided with the image capturing unit described in claimed 15.

* * * * *